(12) United States Patent
Ojha et al.

(10) Patent No.: US 6,598,026 B1
(45) Date of Patent: Jul. 22, 2003

(54) METHODS AND APPARATUS FOR BROKERING TRANSACTIONS

(75) Inventors: Purnendu Shekhar Ojha, San Francisco, CA (US); Franklin Richard Schmidt, San Francisco, CA (US); Rafael Gustavo Ortiz, La Honda, CA (US)

(73) Assignee: NexTag.com, Inc., San Mateo, CA (US)

( * ) Notice: Subject to any disclaimer, the term of this patent is extended or adjusted under 35 U.S.C. 154(b) by 0 days.

(21) Appl. No.: 09/318,520

(22) Filed: May 25, 1999

Related U.S. Application Data

(62) Division of application No. 09/265,511, filed on Mar. 9, 1999.
(60) Provisional application No. 60/117,118, filed on Jan. 25, 1999.

(51) Int. Cl.[7] ............................................. G06F 17/60
(52) U.S. Cl. ............................. 705/26; 705/1; 705/80; 705/27
(58) Field of Search ........................... 705/26, 27, 1, 705/80, 37

(56) References Cited

U.S. PATENT DOCUMENTS

| | | | |
|---|---|---|---|
| 4,247,759 A | 1/1981 | Yuris et al. ................. 235/381 |
| 4,449,186 A | 5/1984 | Kelly et al. ................. 364/407 |
| 4,553,222 A | 11/1985 | Kurland et al. ............. 364/900 |
| 4,789,928 A | 12/1988 | Fujisaki ...................... 364/401 |
| 4,799,156 A | 1/1989 | Shavit et al. ............... 364/401 |
| 4,903,201 A | 2/1990 | Wagner ....................... 364/408 |
| 5,021,953 A | 6/1991 | Webber et al. .............. 364/407 |
| 5,168,446 A | 12/1992 | Wiseman ..................... 364/408 |
| 5,191,613 A | 3/1993 | Graziano et al. ............. 380/25 |
| 5,557,518 A | 9/1996 | Rosen ......................... 364/408 |
| 5,758,328 A | * 5/1998 | Giovannoli .................. 705/26 |
| 5,794,207 A | * 8/1998 | Walker et al. ................. 705/1 |

(List continued on next page.)

FOREIGN PATENT DOCUMENTS

| JP | 2002032597 A | * 1/2002 | ........... G06F/17/60 |
| WO | WO 97/23838 | * 7/1997 | ........... G06F/17/60 |

OTHER PUBLICATIONS

Anonymous, "Buying a car on–line", Successful Meetings; Philadelphia; Oct. 1998, vol. 47,issue 11, 2 pages, extracted from http://proquest.umi.com on Feb. 21, 2002.*

(List continued on next page.)

*Primary Examiner*—Wynn W. Coggins
*Assistant Examiner*—Y. C. Garg
(74) *Attorney, Agent, or Firm*—Beyer Weaver & Thomas, LLP

(57) ABSTRACT

Methods and apparatus are described for facilitating a transaction between a buyer and one of a plurality of sellers via the Internet. Product information relating to a plurality of products meeting product criteria specified by the buyer is presented via the Internet. One of the plurality of sellers is associated with each of the products. A first bid from the buyer for a first one of the plurality of products is made available via the Internet to a first seller associated with the first product. A first bid response is presented via the Internet to the buyer according to response criteria specified by the first seller. Where the first bid response is an acceptance of the first bid, consummation of the transaction is facilitated. Where the first bid response is a counteroffer, further negotiation via the Internet between the buyer and the first seller is enabled.

13 Claims, 29 Drawing Sheets

U.S. PATENT DOCUMENTS

| | | | |
|---|---|---|---|
| 5,797,127 A | 8/1998 | Walker et al. ................ 705/5 |
| 5,826,244 A * | 10/1998 | Huberman |
| 5,845,265 A | 12/1998 | Woolston .................... 705/37 |
| 5,897,620 A | 4/1999 | Walker et al. ................ 705/5 |
| 5,991,740 A * | 11/1999 | Messer ........................ 705/27 |
| 6,026,374 A | 2/2000 | Chess ........................... 705/26 |
| 6,041,308 A | 3/2000 | Walker et al. ................ 705/14 |
| 6,055,513 A | 4/2000 | Katz et al. .................... 705/26 |
| 6,055,519 A * | 4/2000 | Kennedy et al. ............. 705/80 |
| 6,064,980 A | 5/2000 | Jacobi et al. ................. 705/26 |
| 6,078,906 A * | 6/2000 | Huberman |
| 6,085,169 A * | 7/2000 | Walker et al. ................ 705/26 |
| 6,134,534 A * | 10/2000 | Walker et al. ................ 705/26 |
| 6,141,653 A * | 10/2000 | Conklin et al. |
| 6,260,024 B1 * | 7/2001 | Shkedy ........................ 705/10 |
| 6,266,652 B1 * | 7/2001 | Godin et al. ................. 705/37 |
| 2002/0082946 A1 * | 6/2002 | Morrison et al. ............. 705/27 |

OTHER PUBLICATIONS

Anonymous, "Buying a car on–line", Successful Meetings; Philadelphia; Oct. 1998, vol.47, Issue 11, 2 pages, extracted from Internet http://proquest.umi.com on Feb. 21, 2002.*

Hamel et al., The E–Corporation from Fortune magazine, Dec. 1998, vol.138, issue, p80 received in IDS, paper No., 5.*

Robert Kuttner, "Computers May Turn the World into One Big Commodities Pit," Sep. 11, 1989, *Business Week*, No. 3123, p. 17 (3 pages).

Fran Golden, "AAL's Riga Doubts Marketel's Appeal to Retailers," Nov. 13, 1989, *Travel Weekly*, vol. 48, No. 91, p. 4, ISSN: 0041–2082, (4 pages).

Michael Schrage, "An Experiment in Economic Theory; Labs Testing Real Markets," Nov. 26, 1989, *The Record*, p. B01 (5 pages).

Jeffrey B. Ritter, "Scope of the Uniform Commerical Code: Computer Contracting Cases and Electronic Commerical Practices," Aug. 1990, *Business Lawyer*, 45 Bus. Law. 2533, (22 pages).

Laura Del Rosso, "Marketel Says it Plans to Launch Air Fare 'Auction' in Jun.," Apr. 29, 1991, *Travel Weekly*, vol. 50, No. 34, p. 1, ISSN 0041–2082 (6 pages).

Jeff Pelline, "Travelers Bidding on Airline Tickets SF Firm Offers Chance for Cut–Rate Fares," Aug. 19, 1991, *The San Francisco Chronicle*, p. A4, (5 pages).

Laura Del Rosso, "Ticket–bidding Firm Closes its Doors," Mar. 12, 1992, *Travel Weekly*, vol. 51, No. 21, p. 1, ISSN 0041–2082, (3 pages).

Speidel and Schott, "Impact of Electronic Contracting on Contract Formation Under Revised UCC Article 2, Sales," Dec. 9, 1993, *The American Law Institute*, C878 ALI–ABA 335, (4 pages).

Bugge, et al. (Drafting Committee to Revise), "Draft of Uniform Commercial Code Revised Article 2. Sales, Parts 2, 3 and 7," Jan. 4, 1996, *The American Law Institute and National Conference of Commissioners on Uniform State Laws*, (35 pages).

Web Site for BookIt!, 1996, *Web Ventures*, (1 page).

Raymond T. Nimmer, "Electronic Contracting: Legal Issues," 1996, *Journal of Computer & Information Law*, vol. XIV, pp. 211–244.

Skyauction.com, from web page http://www.skyauction.com.

Refer–it.com, from web page http://refer–it.com/main.cfm.

MedicineOnline.com, from web page http://medicineonline.com.

Gazoom.com, from web page http://gazoom.com.

Epinion.com, from web page http://epinions.com.

Priceline.com, from web page http://travel.priceline.com.

Hamel et al., *The E–Corporation*, from Fortune magazine, Dec. 1998, vol.138, issue 11, p80.

Rehder, *Object–Oriented Customer Education*, from Hewlett–Packard Journal, Feb. 1997, vol. 48, issue 1, p96.

Lewis et al., *Travel Agents: Threatened Intermediaries?*, Spring 1997, vol. 36, Issue 3, p. 26.

* cited by examiner

| Guest | NexTag Main | Merchant | User Registration | FAQ | Company Info |

*neXTAG* --- for on-line Price Negotiations

THREE EASY STEPS FOR PRICE NEGOTIATIONS

1. Search for Computer Products you want
2. Save alternatives from search results into your list
3. Start negotiations by placing bids for selected items in your list Email
[ joev@beyerlaw.com ]

Password
[              ]  [Login]

I forgot my password
I would like to Register

Hi Guest

User level: "Beginner"

| Multi-merchant Product search |

Product Type [ ANY ▼ ]     Advanced Search

Keyword (s): [              ] [Go]

| SHORTLIST FOR my list | | | | Sorted by | Most Recent ▼ | | | |
|---|---|---|---|---|---|---|---|---|
| Product | Manufacturer | Merchant | List Price | Comments | Ask Price | Bid Price | Bid | Edit |
| Share your lists with friends family or co-workers  - get their opinions for you purchase ||||||||| 
| Email this table to: | | | | | | | | [Send] |

| Logout | NexTag Main | Merchant | Account Info | FAQ | Company Info |

Joe's Dashboard:  User level: Intermediate

Step 1. Use Existing Shopping list or create a new one by typing an item name and clicking "New"

SHOPPING LIST [my list ▼] [Edit]   [          ] [New]

Step 2. Multi-merchant Product search - to identify alternatives for your Shopping List item.

Product type [Laptop ▼]   Advanced Search

Keyword (s): [thinkpad 600] [Go]

| SHORTLIST FOR my list | | | | | | | | Sorted by [Most Recent ▼] |
|---|---|---|---|---|---|---|---|---|
| Product | Manufacturer | Merchant | List Price | Comments | Ask Price | Bid Price | Bid | Edit |

Share your lists with friends family or co-workers - get their opinions for you purchase Email this table to: [          ] [Send]

| Logout | NexTag Main | Merchant | Account Info | FAQ | Company Info |

Nextag Advanced Search:
Make selections to describe the Product you are looking for:

Product type: [Laptop ▼]   Media: [System ▼]
Processor: [ANY ▼]   Speed: [ANY ▼]
Display Size: [ANY ▼]

Type in any of the parameters below and click search

Manufacturer: [____]   List Price Range: Min.($): [____] Max.($): [____]

Keywords: [thinkpad 600]   [Search]

NexTag Search Results:
14 Products found
SORT BY: [____]

| Manufacturer | Product | Lowest Price | Save to List |
|---|---|---|---|
| IBM | THINKPAD 600 P2-233 3.2GB 32MB 12.1 TFT 24X WIN 95 | $2198.99 | Save |
| IBM | THINKPAD 600 P2-233 3.2GB 32MB 12.1 TFT 24X WIN 95 | $2248.00 | Save |
| IBM | THINKPAD 600E P2 300PE 4.0GB 32MB 13.3 TFT 24X WIN 98/95 | $2732.36 | Save |
| IBM | THINKPAD 600 P2-266 4.0GB 32MB 13.3 TFT 24X WIN 95 | $2798.99 | Save |
| IBM | THINKPAD 600 P2-266 NO HD 32MB 13.3 TFT NO O/S (NIP) | $2811.93 | Save |
| IBM | THINKPAD 600 P2-300 5.1GB 64MB 24X 13.3 TFT WIN NT | $3455.22 | Save |
| IBM | THINKPAD 600 P2-266 4.0GB NO*IBM*PROGRAM*DISCOUNTS NO*RET | $3490.19 | Save |
| IBM | THINKPAD 600 P2-300 5.1GB 64MB 24X 13.3 TFT WIN 98 | $3498.99 | Save |
| IBM | THINKPAD 600E P2-300 6.4GB 64MB DVD 13.3 TFT WIN 98 | $3651.99 | Save |
| IBM | THINKPAD 600E P2-300 6.4GB 32MB 13.3 TFT 2X DVD WIN 98 | $3698.99 | Save |
| IBM | THINKPAD 600E P2-366 6.4GB 64MB 13.3 TFT 24X WIN98/95 | $3828.92 | Save |
| IBM | THINKPAD 600E P2-366 6.4GB 64MB 13.3 TFT DVD WIN 98/95 | $3920.81 | Save |
| IBM | THINKPAD 600E P2-366 6.4GB 64MB 13.3 TFT 24X NT | $3920.81 | Save |
| IBM | THINKPAD 600 P2-300 5.1GB NO IBM PROGRAM DISCOUNTS/NO RET | $4152.28 | Save |

Fig. 5

| Logout | NexTag Main | Merchant | Account Info | FAQ | Company Info |

Nextag Advanced Search:

Make selections to describe the Product you are looking for:

Product type: Laptop ▼  Media: System ▼

Processor: ANY ▼  Speed: ANY ▼

Display Size: ANY ▼

Type in any of the parameters below and click search

Manufacturer: [ ]  List Price Range: Min.($): [ ] Max.($): [ ]

Keywords: thinkpad 600   [Search]

NexTag Search Results:

14 Products found

SORT BY: [ ]

| Manufacturer | Product | Lowest Price | Save to List |
|---|---|---|---|
| IBM | THINKPAD 600 P2-233 3.2GB 32MB 12.1 TFT 24X WIN 95 | $2198.99 | Saved |
| IBM | THINKPAD 600 P2-233 3.2GB 32MB 12.1 TFT 24X WIN 95 | $2248.00 | Saved |
| IBM | THINKPAD 600E P2 300PE 4.0GB 32MB 13.3 TFT 24X WIN 98/95 | $2732.36 | Saved |
| IBM | THINKPAD 600 P2-266 4.0GB 32MB 13.3 TFT 24X WIN 95 | $2798.99 | Saved |
| IBM | THINKPAD 600 P2-266 NO HD 32MB 13.3 TFT NO O/S (NIP) | $2811.93 | Save |
| IBM | THINKPAD 600 P2-300 5.1GB 64MB 24X 13.3 TFT WIN NT | $3455.22 | Save |
| IBM | THINKPAD 600 P2-266 4.0GB NO*IBM*PROGRAM*DISCOUNTS NO*RET | $3490.19 | Save |
| IBM | THINKPAD 600 P2-300 5.1GB 64MB 24X 13.3 TFT WIN 98 | $3498.99 | Save |
| IBM | THINKPAD 600E P2-300 6.4GB 64MB DVD 13.3 TFT WIN 98 | $3651.99 | Save |
| IBM | THINKPAD 600E P2-300 6.4GB 32MB 13.3 TFT 2X DVD WIN 98 | $3698.99 | Save |
| IBM | THINKPAD 600E P2-366 6.4GB 64MB 13.3 TFT 24X WIN98/95 | $3828.92 | Save |
| IBM | THINKPAD 600E P2-366 6.4GB 64MB 13.3 TFT DVD WIN 98/95 | $3920.81 | Save |
| IBM | THINKPAD 600E P2-366 6.4GB 64MB 13.3 TFT 24X NT | $3920.81 | Save |
| IBM | THINKPAD 600 P2-300 5.1GB NO IBM PROGRAM DISCOUNTS/NO RET | $4152.28 | Save |

| Logout | NexTag Main | Merchant | Account Info | FAQ | Company Info | Help |

Joe's Dashboard:

Step 1. Multi-merchant Product search - to identify alternatives for your Shopping List item.

Product type [ ANY ▼ ]   Advanced Search

Keyword (s): [_____] [Go]

Step 2. Use Existing Shopping list or create a new one by clicking "New"

SHOPPING LIST [ my list ▼ ] [ Edit ] [ New List ]

SHOPPING LIST FOR my list

| IBM | THINKPAD 600 P2-233 3.2GB 32MB 12.1 TFT 24X WIN 95 | Units: 1 | [Comment] | [X] |
| IBM | THINKPAD 600 P2-233 3.2GB 32MB 12.1 TFT 24X WIN 95 | Units: 1 | [Comment] | [X] |
| IBM | THINKPAD 600E P2 300PE 4.0GB 32MB 13.3 TFT 24X WIN 98/95 | Units: 1 | [Comment] | [X] |
| IBM | THINKPAD 600 P2-266 4.0GB 32MB 13.3 TFT 24X WIN 95 | Units: 1 | [Comment] | [X] |

Share your lists with friends family or co-workers - get their opinions for you purchase Email this table to: [_____] [Send]

Beta evaluators, please email your feedback to beta@nextag.com

| Logout | NexTag Main | Adv. Search Product Details | Account Info | FAQ | Company Info |

NexTag -- Product Details and Prices at ALL Merchants

SHOPPING LIST | my list ▼ | Edit | New List

| Manufacturer | Product | Manuf.Part# | Units |
|---|---|---|---|
| IBM | THINKPAD 600 P2-233 3.2GB 32MB 12.1 TFT 24X WIN 95 | 264535U | 1 |

| Merchant | Updated | In Stock? | List | Ask | | Bid | Save |
|---|---|---|---|---|---|---|---|
| Merchant 1 | Feb 3, 1999 | Y | $2198.99 | $2198.99 | Buy | 2000.0 / Bid | Save |
| Merchant 2 | Dec 10, 1998 | Y | $2794.39 | $2794.39 | Buy | Bid | Save |
| Merchant 3 | Jan 13, 1999 | | $2800.19 | $2800.19 | Buy | Bid | Save |
| Merchant 4 | Nov 30, 1998 | Yes | $2829.00 | $2829.00 | Buy | Bid | Save |
| Merchant 5 | Jan 3, 1999 | | $2985.99 | $2985.99 | Buy | Bid | Save |

Product Description:

PRODUCT IMAGE & DESCRIPTION

| Logout | NexTag Main | Merchant | Account Info | FAQ | Company Info | Help |

Joe's Dashboard:

Step 1. Multi-merchant Product search - to identify alternatives for your Shopping List item.

Product type: [ANY ▼]     Advanced Search

Keyword (s): [_____] [Go]

Step 2. Use Existing Shopping list or create a new one by clicking "New"

SHOPPING LIST [my list ▼] [Edit] [New List]

SHOPPING LIST FOR my list

IBM — THINKPAD 600 P2-233 3.2GB 32MB 12.1 TFT 24X WIN 95 — Units: 1 [Comment] [X]

| Merchant | List Price | Ask Price | | Bid Price | | |
|---|---|---|---|---|---|---|
| Merchant 1 | $2198.99 | $2198.99 | [Buy] | $[2000.0] [Bid] | [Comment] | [X] |
| | $2198.99 | $2198.99 | [Buy] | $[____] [Bid] | [Comment] | [X] |

IBM — THINKPAD 600 P2-233 3.2GB 32MB 12.1 TFT 24X WIN 95 — Units: 1 [Comment] [X]

| Merchant | List Price | Ask Price | | Bid Price | | |
|---|---|---|---|---|---|---|
| Merchant 4 | $2248.00 | $2248.00 | [Buy] | $[2100.0] [Bid] | [Comment] | [X] |

IBM — THINKPAD 600E P2 300PE 4.0GB 32MB 13.3 TFT 24X WIN 98/95 — Units: 1 [Comment] [X]

| Merchant | List Price | Ask Price | | Bid Price | | |
|---|---|---|---|---|---|---|
| Merchant 6 | $2732.36 | $2732.36 | [Buy] | $[2500.0] [Bid] | [Comment] | [X] |

IBM — THINKPAD 600 P2-266 4.0GB 32MB 13.3 TFT 24X WIN95 — Units: 1 [Comment] [X]

| Merchant | List Price | Ask Price | | Bid Price | | |
|---|---|---|---|---|---|---|
| Merchant 1 | $2798.99 | $2798.99 | [Buy] | $[2600.0] [Bid] | [Comment] | [X] |

Share your lists with friends family or co-workers - get their opinions for you purchase Email this table to: [_____] [Send]

Beta evaluators, please email your feedback to beta@nextag.com

| Merchant Login | NexTag Main | Adv. Search | FAQ | Company Info |

*neXTAG* --- login page for Member Merchants

Your Website for:

1. Incremental revenues from existing and new customers
2. Cost savings: Lowering your call center costs
3. Selectively lower pricing for selected buyers without affecting prices charged to others
4. Making Block sales by lowering prices by an amount driven by real-time product demand curves
5. Market and Buyer data including real-time demand curves, and product price histories

Registered members

Email
[                                        ]

Password
[                    ] [ Login ]
I forgot my password

Merchant Visitors

Buyer Services
Contact Us to join

| Logout | Dashboard Edit this View | Account Info | Business Rules | NexTag Main |

NexTag Merchant Main: super for Merchant 1

| Bids to Display: || Sorting Order ||
|---|---|---|---|
| By Bid Type: | By Bid-List Spread | Primary | Secondary |
| All Bids ▼ | Max $: [ ] OK  Max % ▼ | Buyer ▼ | ▼ |

| Product | Buyer Id | Units | Your List | Your Ask | Bid to You | Min Bid | Max Bid |
|---|---|---|---|---|---|---|---|
| THINKPAD 600 P2-233 3.2GB 32MB 12.1 TFT 24X WIN 95 | 187 | | $2198.99 | $2198.99 | | | |
| PALM III CONNECTED ORGANIZER PALMPILOT | 148 | 5 | $269.00 | | | $305.00 | $305.00 |
| THINKPAD 600 P2-233 3.2GB 32MB 12.1 TFT 24X WIN 95 | 147 | 1 | $2198.99 | $2198.99 | $2000.00 | $2000.00 | $2000.00 |
| THINKPAD 600 P2-233 3.2GB 32MB 12.1 TFT 24X WIN 95 | 147 | 1 | | | | $2100.00 | $2100.00 |
| THINKPAD 600E P2 300PE 4.0GB 32MB 13.3 TFT 24X WIN 98/95 | 147 | 1 | $2999.00 | | | $2500.00 | $2500.00 |
| THINKPAD 600 P2-266 4.0GB 32MB 13.3 TFT 24X WIN 95 | 147 | 1 | $2798.99 | $2798.99 | $2600.00 | $2600.00 | $2600.00 |
| OMNIBOOK 2100 P2-233 4.0GB-HD 32MB 12.1 TFT 24X WIN 95 NO PP | 128 | | $1998.99 | $1998.99 | | | |
| OMNIBOOK 2100 P2-266 4.0GB-HD 32MB 12.1 TFT 24X WIN 95 NO PP/R | 128 | | $2398.99 | $2398.99 | | | |
| THINKPAD 600 P2-233 3.2GB 32MB 12.1 TFT 24X WIN 95 | 127 | | $2198.99 | $2198.99 | | | |
| THINKPAD 600 P2-233 3.2GB 32MB 12.1 TFT 24X WIN 95 | 109 | | $2198.99 | $2198.99 | | | |
| BACKOFFICE SMALL BUSINESS SRV WIN-NT W/OFFICE PRO 5 CLIENT | 109 | 10 | $3350.00 | | | $2800.00 | $2800.00 |
| THINKPAD 600 P2-233 3.2GB 32MB 12.1 TFT 24X WIN 95 | 108 | | $2198.99 | $2198.99 | | | |
| THINKPAD 600 P2-233 3.2GB 32MB 12.1 TFT 24X WIN 95 | 107 | | | | | | |
| THINKPAD 600 P2-233 3.2GB 32MB 12.1 TFT 24X WIN 95 | 88 | | $2198.99 | $2198.99 | | | |
| THINKPAD 600 P2-233 3.2GB 32MB 12.1 TFT 24X WIN 95 | 87 | | $2198.99 | $2198.99 | | | |
| PALM III CONNECTED ORGANIZER | 67 | 1 | $269.00 | $269.00 | $265.00 | $265.00 | $265.00 |

Pages: 1 2 3

| Logout | Dashboard Trading Screen | Account Info | Business Rules | NexTag Main |
|---|---|---|---|---|

NexTag Trading Screen for Merchant 1

| Product | Manufacturer | Manuf. Part# | List Price | Ask Price | Buyer Email | Bid Price |
|---|---|---|---|---|---|---|
| THINKPAD 600 P2-233 3.2GB 32MB 12.1 TFT 24X WIN 95 | IBM | 264535U | $2198.99 | $2198.99 | joev@beyerlaw.com | $2000.00 |

| BID-SPECIFIC RESPONSE | | |
|---|---|---|
| You have two options for this bid: | | |
| 1. Accept the Buyer's Bid Price: | Accept Bid Price | |
| 2. Change your Ask Price: | $ 2100.00 | Submit |
| BLOCK RESPONSE | | |
| All bids to you that are higher than the block ask price will be accepted at the corresponding bid price. Other bidders for this product will receive your Block Ask Price. | | |
| Block ASK Price: | $ | Submit |

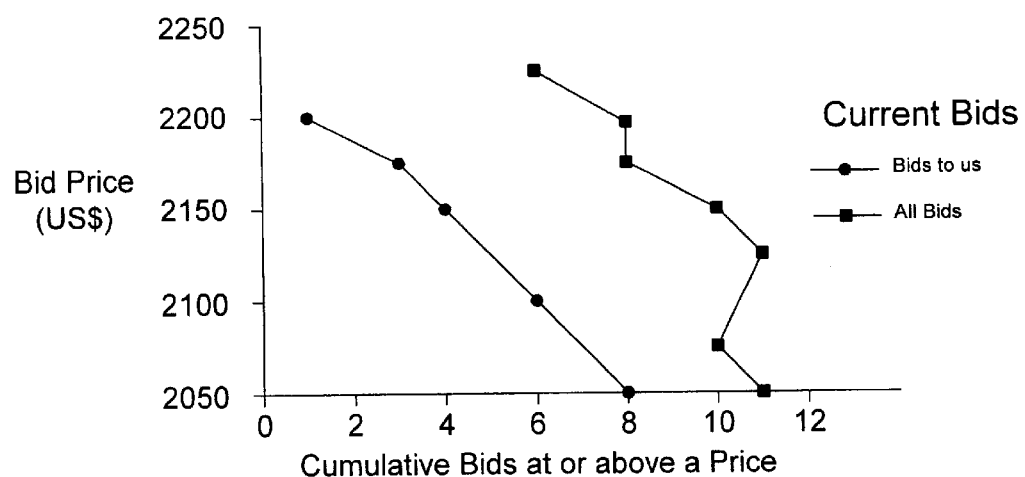

| Buyer Details | | | |
|---|---|---|---|
| Email Address: | joev@beyerlaw.com | First Name: | Joe |
| Company Name: | Beyer & Weaver | Job Title: | |
| Address (line 1): | | Address (line 2): | |
| City: | | State: | |
| Country (if not USA): | | Phone Number: | |

| Logout | Dashboard | Account Info | Business Rules | NexTag Main |

NexTag Business Rules for Merchant 1

| Rule Number 1 | | | | |
|---|---|---|---|---|
| Comment: | Price Drop Counter-Offer | Email Bids to: | purnendu@nextag.com | |
| Criteria: | % Bid-List Spread ▼ | Max % Spread: | 2.0 | AND... |
| Pricing Response: | Counter-Offer ▼ | Reduce Ask by: | ◉ 1.0 % of list ○ $ | |
| Text Response: | This offer good for 8 hours. | | | |
| New Rule | | Password: | | |
| | | | Submit | Reset |

| Logout | Dashboard | Account Info | Business Rules | NexTag Main |

NexTag Business Rules for Merchant 1

| Rule Number 1 | | | |
|---|---|---|---|
| Comment: | Price Drop Counter-Offer | Email Bids to: | purnendu@nextag.com |
| Criteria: | % Bid-List Spread ▼ | Max $ Spread: | [ ] AND... |
| Pricing Response: | Counter-Offer ▼ | Reduce Ask by: | ⦿ 1.0 % of list ○ $ [ ] |
| Text Response: | This offer good for 8 hours. | | |
| New Rule | | Password: | [ ] |
| | | | Submit  Reset |

NexTag Business Rules for Merchant 1

| Rule Number 1 | | | |
|---|---|---|---|
| Comment: | Price Drop Counter-Offer | Email Bids to: | purnendu@nextag.com |
| Criteria: | Product Specific ▼ | Enter product UPC codes | AND... |
| | | | |
| Pricing Response: | Counter-Offer ▼ | Reduce Ask by: | ⦿ 1.0 % of list ○ $ ☐ |
| Text Response: | This offer good for 8 hours. | | |
| New Rule | | Password: | |
| | | | Submit  Reset |

| Logout | Dashboard | Account Info | Business Rules | NexTag Main |

NexTag Business Rules for Merchant 1

| Rule Number 1 | | | |
|---|---|---|---|
| Comment: | Price Drop Counter-Offer | Email Bids to: | purnendu@nextag.com |
| Criteria: | Buyer Specific ▼ | Enter buyer emails or domains | AND... |
| | | | |
| Pricing Response: | Counter-Offer ▼ | Reduce Ask by: | ⦿ 1.0 % of list ○ $ |
| Text Response: | This offer good for 8 hours. | | |
| New Rule | | Password: | |
| | | | Submit  Reset |

| Logout | Dashboard | Account Info | Business Rules | NexTag Main | Help |

NexTag Business Rules for Merchant 1

Current Business Rules:

[ Create New Rule... ]  [ Delete Current Rule... ]

Title:

If all of the following criteria are true

[X] In product set  [ Hi Inventory ▼ ]

[X] % Bid-List Spread  [ >= ▼ ]  [ 50.0 ]

[ add criteria ▼ ]

Then do the following actions

Display text

[X] [ Please be serious -- your bid is less than half our list price ]

[ add action ▼ ]

| Logout | Dashboard | Account Info | Business Rules | NexTag Main | Help |

NexTag Business Rules for Merchant 1

Current Business Rules:

[ Create New Rule... ]  [ Delete Current Rule... ]

Title:

If all of the following criteria are true

[X] In product set  [ Hi Inventory ▼ ]

[X] % Bid-List Spread  [ <= ▼ ]  [ 50.0 ]

[X] % Bid-List Spread  [ >= ▼ ]  [ 10.0 ]

[ add criteria ▼ ]

Then do the following actions

[X] Reduce ask by % of list  [ 10.0 ]

Display text

[X] [ We have a great deal for you -- we can offer you a 10% discount ]

[ add action ▼ ]

| Logout | Dashboard | Account Info | Business Rules | NexTag Main | Help |

NexTag Business Rules for Merchant 1

Current Business Rules:

| Create New Rule... | Delete Current Rule... |

Title:

If all of the following criteria are true

[X] In product set  [ Hi Inventory ▼ ]
[X] % Bid-List Spread  [ <= ▼ ]  [ 10.0 ]
   [ add criteria ▼ ]

Then do the following actions

[X] Accept Bid
   Display text
[X] [ You have a deal from Merchant 1 - we will sell you at your bid price ]
   [ add action ▼ ]

| Logout | Dashboard | Account Info | Business Rules | NexTag Main | Help |

NexTag Business Rules for Merchant 1

Current Business Rules:

[ Create New Rule... ]  [ Delete Current Rule... ]

Title:

If all of the following criteria are true

[X] # of units  [ >= ▼ ]  [ 50 ]

[ add criteria ▼ ]

Then do the following actions

[X] Reduce ask by % of list  [ 10.0 ]

Display text

[X] We can offer you a 10% high volume discount to our list price

[ add action ▼ ]

| Logout | Dashboard | Account Info | Business Rules | NexTag Main | Help |

NexTag Business Rules for Merchant 1

Current Business Rules:
[ Create New Rule... ]  [ Delete Current Rule... ]

Title:

If all of the following criteria are true

[X] # of units    [ >= ▼ ]    [ 10 ]
[X] % Bid-List Spread    [ <= ▼ ]    [ 20.0 ]
[X] Buyer Reputation    [ >= ▼ ]    [ 0 ]
    [ add criteria ▼ ]

Then do the following actions

[X] Reduce ask by % of list    [ 6.0 ]
    Display text
[X] [ We can offer you a 6% volume discount ]
    [ add action ▼ ]

| Logout | Dashboard | Account Info | Business Rules | NexTag Main | Help |

NexTag Business Rules for Merchant 1

Current Business Rules:

Create New Rule...    Delete Current Rule...

Title:

If all of the following criteria are true add criteria ▼

Then do the following actions add action ▼

| Logout | Dashboard | Account Info | Business Rules | NexTag Main | Help |

NexTag Business Rules for Merchant 1

Current Business Rules:

[ Create New Rule... ]  [ Delete Current Rule... ]

Title:

If all of the following criteria are true

[X] Buyer Reputation  [ >= ▼ ]  [ 20 ]

[X] # of units  [ >= ▼ ]  [ 10 ]

[ add criteria ▼ ]

Then do the following actions

[X] Reduce ask by % of list  [ 10 ]

Display text

[X] [ Because of your excellent reputation we are able to offer you a 10% volume discount. ]

[ add action ▼ ]

| Logout | Dashboard Edit this View | Account Info | Business Rules | NexTag Main |
|---|---|---|---|---|

NexTag Merchant Main: super for Merchant 1

| Bids to Display: | | | Sorting Order | |
|---|---|---|---|---|
| By Bid Type: | By Bid-List Spread | | Primary | Secondary |
| All Bids ▼ | Max $: [OK] | Max % ▼ | Buyer ▼ | ▼ |

| Product | Buyer Id | Units | Your List | Your Ask | Bid to You | Min Bid | Max Bid |
|---|---|---|---|---|---|---|---|
| THINKPAD 600 P2-233 3.2GB 32MB 12.1 TFT 24X WIN 95 | 187 | | $2198.99 | $2198.99 | | | |
| PALM III CONNECTED ORGANIZER PALMPILOT | 148 | 5 | $269.00 | | | $305.00 | $305.00 |
| THINKPAD 600 P2-233 3.2GB 32MB 12.1 TFT 24X WIN 95 | 147 | 1 | $2198.99 | $2100.00 | $2000.00 | $2000.00 | $2000.00 |
| THINKPAD 600 P2-233 3.2GB 32MB 12.1 TFT 24X WIN 95 | 147 | 1 | | | | $2100.00 | $2100.00 |
| THINKPAD 600E P2 300PE 4.0GB 32MB 13.3 TFT 24X WIN 98/95 | 147 | 1 | $2999.00 | | | $2500.00 | $2500.00 |
| THINKPAD 600 P2-266 4.0GB 32MB 13.3 TFT 24X WIN 95 | 147 | 1 | $2798.99 | $2798.99 | $2600.00 | $2600.00 | $2600.00 |
| OMNIBOOK 2100 P2-233 4.0GB-HD 32MB 12.1 TFT 24X WIN 95 NO PP | 128 | | $1998.99 | $1998.99 | | | |
| OMNIBOOK 2100 P2-266 4.0GB-HD 32MB 12.1 TFT 24X WIN 95 NO PP/R | 128 | | $2398.99 | $2398.99 | | | |
| THINKPAD 600 P2-233 3.2GB 32MB 12.1 TFT 24X WIN 95 | 127 | | $2198.99 | $2198.99 | | | |
| THINKPAD 600 P2-233 3.2GB 32MB 12.1 TFT 24X WIN 95 | 109 | | $2198.99 | $2198.99 | | | |
| BACKOFFICE SMALL BUSINESS SRV WIN-NT W/OFFICE PRO 5 CLIENT | 109 | 10 | $3350.00 | | | $2800.00 | $2800.00 |
| THINKPAD 600 P2-233 3.2GB 32MB 12.1 TFT 24X WIN 95 | 108 | | $2198.99 | $2198.99 | | | |
| THINKPAD 600 P2-233 3.2GB 32MB 12.1 TFT 24X WIN 95 | 107 | | | | | | |
| THINKPAD 600 P2-233 3.2GB 32MB 12.1 TFT 24X WIN 95 | 88 | | $2198.99 | $2198.99 | | | |
| THINKPAD 600 P2-233 3.2GB 32MB 12.1 TFT 24X WIN 95 | 87 | | $2198.99 | $2198.99 | | | |
| PALM III CONNECTED ORGANIZER | 67 | 1 | $269.00 | $269.00 | $265.00 | $265.00 | $265.00 |

Pages: 1 2 3

| Logout | NexTag Main | Merchant | Account Info | FAQ | Company Info | Help |

Joe's Dashboard:

Step 1. Multi-merchant Product search - to identify alternatives for your Shopping List item.

Product type [ ANY ▼ ]    Advanced Search

Keyword (s): [           ] [Go]

Step 2. Use Existing Shopping list or create a new one by clicking "New"

SHOPPING LIST [ my list ▼ ] [Edit] [New List]

SHOPPING LIST FOR my list

IBM — THINKPAD 600 P2-233 3.2GB 32MB 12.1 TFT 24X WIN 95  Units: 1  [Comment] [X]

| Merchant | List Price | Ask Price | | Bid Price | | |
|---|---|---|---|---|---|---|
| Merchant 1 | $2198.99 | $2100.00 | [Buy] | $[2000.0] [Bid] | [Comment] | [X] |

IBM — THINKPAD 600 P2-233 3.2GB 32MB 12.1 TFT 24X WIN 95  Units: 1  [Comment] [X]

| Merchant | List Price | Ask Price | | Bid Price | | |
|---|---|---|---|---|---|---|
| Merchant 4 | $2248.00 | $2248.00 | [Buy] | $[2100.0] [Bid] | [Comment] | [X] |

IBM — THINKPAD 600E P2 300PE 4.0GB 32MB 13.3 TFT 24X WIN 98/95  Units: 1  [Comment] [X]

| Merchant | List Price | Ask Price | | Bid Price | | |
|---|---|---|---|---|---|---|
| Merchant 6 | $2732.36 | $2732.36 | [Buy] | $[2500.0] [Bid] | [Comment] | [X] |

IBM — THINKPAD 600 P2-266 4.0GB 32MB 13.3 TFT 24X WIN95  Units: 1  [Comment] [X]

| Merchant | List Price | Ask Price | | Bid Price | | |
|---|---|---|---|---|---|---|
| Merchant 1 | $2798.99 | $2798.99 | [Buy] | $[2600.0] [Bid] | [Comment] | [X] |

Share your lists with friends family or co-workers - get their opinions for you purchase Email this table to: [           ] [Send]

Beta evaluators, please email your feedback to beta@nextag.com

| Logout | NexTag Main | Merchant | Account Info | FAQ | Company Info | Help |

Joe's Dashboard:

Step 1. Multi-merchant Product search - to identify alternatives for your Shopping List item.

Product type: [ ANY ▼ ]          Advanced Search

Keyword (s): [_____] [Go]

Step 2. Use Existing Shopping list or create a new one by clicking "New"

SHOPPING LIST [ my list ▼ ] [Edit] [New List]

SHOPPING LIST FOR my list

IBM — THINKPAD 600 P2-233 3.2GB 32MB 12.1 TFT 24X WIN 95    Units: 1  [Comment] [X]

| Merchant | List Price | Ask Price | | Bid Price | | |
|---|---|---|---|---|---|---|
| Merchant 1 | $2198.99 | $2100.00 | [Buy] | $[2050.0] [Bid] | Comment | [X] |

IBM — THINKPAD 600 P2-233 3.2GB 32MB 12.1 TFT 24X WIN 95    Units: 1  [Comment] [X]

| Merchant | List Price | Ask Price | | Bid Price | | |
|---|---|---|---|---|---|---|
| Merchant 4 | $2248.00 | $2248.00 | [Buy] | $[2100.0] [Bid] | Comment | [X] |

IBM — THINKPAD 600E P2 300PE 4.0GB 32MB 13.3 TFT 24X WIN 98/95    Units: 1  [Comment] [X]

| Merchant | List Price | Ask Price | | Bid Price | | |
|---|---|---|---|---|---|---|
| Merchant 6 | $2732.36 | $2732.36 | [Buy] | $[2500.0] [Bid] | Comment | [X] |

IBM — THINKPAD 600 P2-266 4.0GB 32MB 13.3 TFT 24X WIN95    Units: 1  [Comment] [X]

| Merchant | List Price | Ask Price | | Bid Price | | |
|---|---|---|---|---|---|---|
| Merchant 1 | $2798.99 | $2798.99 | [Buy] | $[2600.0] [Bid] | Comment | [X] |

Share your lists with friends family or co-workers - get their opinions for you purchase Email this table to: [_____] [Send]

Beta evaluators, please email your feedback to beta@nextag.com

| Logout | Dashboard Trading Screen | Account Info | Business Rules | NexTag Main |
|---|---|---|---|---|

NexTag Trading Screen for Merchant 1

| Product | Manufacturer | Manuf. Part# | List Price | Ask Price | Buyer Email | Bid Price |
|---|---|---|---|---|---|---|
| THINKPAD 600 P2-233 3.2GB 32MB 12.1 TFT 24X WIN 95 | IBM | 264535u | $2198.99 | $2100.00 | joev@beyerlaw.com | $2050.00 |

| BID-SPECIFIC RESPONSE | |
|---|---|
| You have two options for this bid: | |
| 1. Accept the Buyer's Bid Price: | [Accept Bid Price] |
| 2. Change your Ask Price: | $ [____] [Submit] |
| BLOCK RESPONSE | |
| All bids to you that are higher than the block ask price will be accepted at the corresponding bid price. Other bidders for this product will receive your Block Ask Price. | |
| Block ASK Price: | $ [____] [Submit] |

| Buyer Details | | | |
|---|---|---|---|
| Email Address: | joev@beyerlaw.com | First Name: | Joe |
| Company Name: | Beyer & Weaver | Job Title: | |
| Address (line 1): | | Address (line 2): | |
| City: | | State: | |
| Country (if not USA): | | Phone Number: | |

| Logout | NexTag Main | Merchant | Account Info | FAQ | Company Info | Help |

Joe's Dashboard:

Step 1. Multi-merchant Product search - to identify alternatives for your Shopping List item.

Product type [ ANY ▼ ]   Advanced Search

Keyword (s): [ _____ ] [ Go ]

Step 2. Use Existing Shopping list or create a new one by clicking "New"

SHOPPING LIST [ my list ▼ ] [ Edit ] [ New List ]

SHOPPING LIST FOR my list

IBM — THINKPAD 600 P2-233 3.2GB 32MB 12.1 TFT 24X WIN 95 — Units: 1 [Comment] [X]

| Merchant | List Price | Ask Price | Purchase Date | activate | |
|---|---|---|---|---|---|
| Merchant 1 | $2198.99 | $2050.00 | 1999-02-15 | Comment | X |

IBM — THINKPAD 600 P2-233 3.2GB 32MB 12.1 TFT 24X WIN 95 — Units: 1 [Comment] [X]

| Merchant | List Price | Ask Price | Purchase Date | activate | |
|---|---|---|---|---|---|
| Merchant 4 | $2248.00 | $2248.00 | | Comment | X |

IBM — THINKPAD 600E P2 300PE 4.0GB 32MB 13.3 TFT 24X WIN 98/95 — Units: 1 [Comment] [X]

| Merchant | List Price | Ask Price | Purchase Date | activate | |
|---|---|---|---|---|---|
| Merchant 6 | $2732.36 | $2732.36 | | Comment | X |

IBM — THINKPAD 600 P2-266 4.0GB 32MB 13.3 TFT 24X WIN95 — Units: 1 [Comment] [X]

| Merchant | List Price | Ask Price | Purchase Date | activate | |
|---|---|---|---|---|---|
| Merchant 1 | $2798.99 | $2798.99 | | Comment | X |

Share your lists with friends family or co-workers - get their opinions for you purchase Email this table to: [ _____ ] [ Send ]

Beta evaluators, please email your feedback to beta@nextag.com

METHODS AND APPARATUS FOR BROKERING TRANSACTIONS

This is a Divisional application of copending prior application Ser. No. 09/265,511 filed on Mar. 9,1999, which is based upon Provisional Application No. 60/117,118 filed on Jan. 25, 1999, the disclosures of which are incorporated herein by reference.

RELATED APPLICATION DATA

The present application claims priority from U.S. Provisional Application No. 60/117,118 filed on Jan. 25, 1999, the entirety of which is incorporated by reference herein for all purposes.

BACKGROUND OF THE INVENTION

The present invention relates to electronic commerce via the Internet. More specifically, the present invention relates to the facilitation of transactions between buyers and sellers on the World Wide Web.

Electronic commerce on the Internet, and specifically the World Wide Web, promises to transformi the economic landscape in ways which have not yet been contemplated. Consumers and corporate buyers already have online access to a staggering variety of goods and services from a wide range of merchants and service providers. They may electronically search through vast inventories to easily and conveniently find products to fit their needs, often at a significant savings over traditional commerce. They may also initiate and complete transactions online simply by identifying a product and submitting a payment identifier such as a credit card or purchasing account to the appropriate web site.

Electronic commerce also offers a number of advantages to the merchant or service provider. Offering products online avoids all of the overhead associated with operating retail or wholesale locations. In addition, online sellers do not need to anticipate the inventory needs of a number of different geographic locations. In fact, inventory may be centralized and precisely and automatically monitored and adjusted according to transaction data which are gathered virtually instantaneously. Moreover, the World Wide Web has the potential for making a particular seller's goods or services available to anyone, any time, anywhere on the planet. The cost savings and the market access associated with these advantages combine to give online sellers a significant competitive edge over their more traditional counterparts.

Given the obvious potential of electronic commerce and the rapidly increasing traffic at web sites engaging in electronic commerce, it's no surprise that there is a demand for technical solutions by which electronic commerce transactions may be facilitated and made more efficient. Such solutions range from increasing the speed and efficiency with which data are transferred over the Internet to improving search engine capabilities to creating more user-friendly interfaces. Unfortunately, all of the solutions presented to date have not been able to reproduce an important part of traditional commerce and its attendant advantages for both sellers and buyers. That is, none of today's electronic commerce solutions allows for the give and take of a traditional negotiation between individual sellers and buyers.

An example of one solution for facilitating transactions between a buyer and one or more sellers is described in U.S. Pat. No. 5,794,207 for METHOD AND APPARATUS FOR CRYPTOGRAPHICALLY ASSISTED COMMERCIAL NETWORK SYSTEM DESIGNED TO FACILITATE BUYER-DRIVEN CONDITIONAL PURCHASE OFFER issued on Aug. 1, 1998, the entirety of which is incorporated herein by reference for all purposes. In that patent, a system is described by which a prospective buyer communicates a binding purchase offer globally to a plurality of sellers. The offer is made binding by requiring the buyer to submit a payment identifier such as, for example, a credit card. Any of the potential sellers may then bind the buyer by accepting the offer.

It is clear that such a solution does not resemble a traditional negotiation. In traditional situations, a prospective buyer can make a conditional offer which may be countered by the seller which may again be countered by the buyer. Traditionally, neither party is bound until both agree upon a price. In this way, the exact price may be identified at which a transaction could proceed as between the two specific parties. It will be understood that the ability to identify this price for any two parties in an efficient manner would be of potentially great value to both buyers and sellers. That is, buyers would be getting the product they want for the price they are willing to pay, while sellers would be effecting a greater number of sales due to their ability to engage in price discrimination.

There are, however, some attendant disadvantages associated with allowing buyers to submit non-biding bids. For example, if there are no consequences to the buyer for submitting a bid, many bids may be submitted by a single buyer or a small group of buyers solely for the purpose of manipulating the market for a particular product. Moreover, resources may be wasted by a seller in pursuing a proliferation of non-serious bids. As discussed above, one solution is to require that a buyer submit a credit card number before he may submit a bid, and further to assess some financial penalty against the buyer's credit card if the buyer abandons the negotiation. Unfortunately, this may serve as a barrier to entry for many buyers in that they are much less likely to conduct simultaneous negotiations with a number of merchants under these conditions.

It is therefore desirable to provide an electronic commerce solution by which individual buyers may negotiate online in a traditional and non-biding manner with one or more sellers.

SUMMARY OF THE INVENTION

According to the present invention, an electronic commerce solution is provided for facilitating online transactions which allows traditional negotiation between a buyer and a seller to occur. According to a specific embodiment, a web site is provided having individual private graphical user interfaces, e.g., web pages, for buyers and sellers. A buyer gains access to his private interface with a user ID and password. The buyer's interface allows him to search a proprietary database for current product information for a variety of products being offered for sale by a number of sellers. The product information includes, for example, the name of the seller and an ask price and/or a list price for the product as specified by the seller. The buyer may save the product information for any products in which he is interested to one or more shopping lists which become part of his interface.

According to a specific embodiment, the buyer may share his shopping list(s) with friends or co-workers to solicit feedback on the various products, sellers, ask prices, etc. The shopping list may be sent in an e-mail as, for example, an HTML table in which the addressee may insert his comments. Alternatively, persons from whom feedback is desired may be notified by e-mail and given access to the buyer's shopping list on the web site itself. In this way, a buyer may solicit advice or approval before initiating a transaction.

For each product saved in the shopping list a bid button is provided, activation of which causes a bid interface to be presented by which the buyer may submit a non-binding bid to the seller of that particular product. Alternatively, the bid interface may be in the shopping list itself. According to a specific embodiment, the bid is made available to a number of different sellers offering the same product. The sellers are "different" in that they include a large number of independent economic entities. This is to be distinguished from other sites in which the "sellers" are all just representatives of a single economic entity. Making the bids available to different economic entities increases the likelihood that at least one of them can offer a price acceptable to the buyer. Using the shopping list, the buyer may make a number of bids for the same or different products to a number of different sellers simultaneously.

According to a specific embodiment of the invention, even though the buyer's bids are non-binding, there is nevertheless a consequence for submitting frivolous bids. That is, the transaction site of the present invention may be configured to track a buyer's "reputation" by tracking the buyer's transaction behavior. For example, the number of bids submitted by a particular buyer could be related to the number of bids honored or reneged upon by that buyer, and an objective value could be generated therefrom indicative of the buyer's "reputation." According to a specific embodiment, the metric is simply the number of offers honored less the number reneged, a large positive value representing a "good" reputation and a large negative value representing a "bad" one. According to another embodiment, the metric is based on the number of times a buyer honors acceptance of his bids. According to yet another embodiment, the metric is based on the percentage of the buyers bids which are eventually consummated. It will be understood that a variety of data could be used to generate a metric indicative of a buyer's transaction behavior and that the present invention is not limited to the few examples described here.

Each buyer's reputation is made available to sellers on the site for use as they see fit. For example, a seller could choose to respond only to bids from buyers who have a reputation which is of a certain level. Alternatively, a seller could choose to respond unfavorably to such buyers, thus giving the buyer immediate feedback and incentive to adjust her bid accordingly. In addition, a seller could give preferential treatment, e.g., discounts, to buyers with very good reputations. Thus, buyers would tend to conduct transactions in a responsible manner to protect their reputations from being damaged and to receive preferential treatment. This approach has many of the advantages of requiring a credit card or other payment identifier without presenting a significant barrier to entry and without making simultaneous negotiation impracticable.

Each seller having products in the proprietary database also has access to a private interface on the web site with which an authorized representative of the seller may have access to all of the currently outstanding bids to that seller for any of the products offered by the seller. According to a specific embodiment, bids to other sellers for products offered by the seller are also available on the seller's private interface. The seller may respond manually to any of the posted bids or, alternatively, the seller may specify a set of business rules according to which automated responses to the posted bids are generated. The response to a bid may be an acceptance of the bid or a counteroffer.

According to various embodiments, market information is displayed along with the list of current bids to help the seller with responding to any or all of the bids, i.e., decision-making support. In one embodiment, demand data are graphically presented, i.e., in a demand curve, representing bids for a particular product to either the particular seller, or a number of different sellers. The seller (or the business rules specified by the seller) can then use the demand data to develop a strategy for responding to one or more bids. For example, a seller can determine how much to temporarily lower an ask price to effect a block deal.

Any bid responses from any sellers show up in the buyer's private interface. According to one embodiment, the responses show up in the shopping list juxtaposed with the original ask price, i.e., the list price, and the buyer's bid. If the seller's response is an acceptance of the buyer's bid, the buyer is enabled to complete the transaction if he so chooses. According to a particular embodiment, this is accomplished by means of an HTML link to the seller's web site. Alternatively, the transaction site can make the buyer's payment and shipping information available to the seller. If, on the other hand, the seller's response is a counteroffer, the buyer may continue the negotiation in the manner described above until a mutually acceptable price is reached, or until the buyer or the seller terminates the negotiation.

As alluded to above, the buyer may conduct a number of simultaneous negotiations with different sellers for the same product or even multiple products. Therefore, according to a specific embodiment, a mechanism is provided by which negotiations with a number of sellers may be automatically terminated when the buyer reaches an agreement with any one seller. That is, the buyer may create a mutually exclusive group with which a plurality of outstanding bids and/or quote solicitations are associated. According to specific embodiments, the buyer creates a mutually exclusive group by designating one of his shopping lists as such a group. When an agreement is reached on any one of the bids or quote solicitations, all other negotiations for the products in the group are automatically terminated. According to various embodiments, such a mutually exclusive group can correspond to a variety of product-seller combinations. That is, a mutually exclusive group can identify one product and multiple sellers, multiple products and multiple sellers, multiple products and one seller, etc. This feature allows a buyer to place a number of simultaneous bids even though he intends to make only a single purchase.

Thus, the present invention provides methods and apparatus for facilitating a transaction between a buyer and one of a plurality of sellers via the Internet. Product information relating to a plurality of products meeting product criteria specified by the buyer is presented via the Internet. One of the plurality of sellers is associated with each of the products. A first bid from the buyer for a first one of the plurality of products is made available via the Internet to a first seller associated with the first product. A first bid response is presented via the Internet to the buyer. According to one embodiment, the first bid response is automatically presented according to response criteria specified by the first seller. Alternatively, the first bid response is presented according to a manually entered communication received from a representative of the first seller. Where the first bid response is an acceptance of the first bid, consummation of the transaction is facilitated. Where the first bid response is a counteroffer, further negotiation via the Internet between the buyer and the first seller is enabled.

According to other specific embodiments, methods and apparatus are provided for facilitating a transaction between a buyer and one of a plurality of sellers via the Internet. The buyer is enabled to negotiate substantially simultaneously with the plurality of sellers via the Internet. When an agreement is reached between the buyer and a first one of the plurality of sellers, negotiations between the buyer and others of the plurality of sellers are automatically terminated.

According to still other embodiments, methods and apparatus are provided for facilitating transactions via the Internet. Market information is made available to a seller via the Internet. The market information relates to a plurality of bids from a plurality of buyers. The seller is enabled to effect transactions via the Internet with a subset of the plurality of buyers based on the market information.

According to still further embodiments, methods and apparatus are provided for facilitating transactions via the Internet. A list of entities is received from a first entity via the Internet. A plurality of Internet transactions are monitored to determine when any of the entities on the list engages in one of the plurality of transactions. For each one of the plurality of transactions in which one of the entities engages, an economic benefit is automatically accrued to the first entity.

According to additional embodiments, methods and apparatus are provided for facilitating transactions between a buyer and a plurality of sellers via the Internet. Product information relating to a plurality of products meeting product criteria specified by the buyer is provided via the Internet. One of the plurality of sellers being associated with each of the products. In response to selection of one of the plurality of products by the buyer, the product information corresponding to the selected product is saved to a shopping list associated with the buyer. The shopping list enables the buyer to subsequently negotiate with selected ones of the plurality of sellers for selected ones of the plurality of products for which the product information has been saved.

According to other specific embodiments, methods and apparatus for facilitating a transaction between a buyer and at least one of a plurality of sellers via the Internet are provided. A plurality of conditional purchase offers from the buyer to a subset of the plurality of sellers is received. Each of the plurality of conditional purchase offers includes an offer price from the buyer. The plurality of conditional purchase offers are transmitted to the subset of the plurality of sellers after receiving a payment identifier. An acceptance responsive to one of the plurality of conditional purchase offers is received from a first one of the plurality of sellers. Negotiations between the buyer and others of the subset of plurality of sellers are automatically terminated in response to the acceptance in accordance with a mutually exclusive group defined by the buyer. A payment is then provided to the first seller using the payment identifier.

According to still other embodiments, a method for facilitating a transaction between a buyer and at least one of a plurality of sellers via the Internet is provided. Product information relating to a plurality of products meeting product criteria specified by the buyer is presented via the Internet. One of the plurality of sellers being associated with each of the products. In response to selection of one of the plurality of products by the buyer, the product information corresponding to the selected product is saved to a shopping list associated with the buyer. The shopping list enables the buyer to subsequently negotiate with selected ones of the plurality of sellers for selected ones of the plurality of products for which the product information has been saved. At least one conditional purchase offer from the buyer to a subset of the plurality of sellers is received. The at least one conditional purchase offer includes an offer price from the buyer. The at least one conditional purchase offer is transmitted to the subset of the plurality of sellers after receiving a payment identifier. An acceptance is received from a first one of the plurality of sellers. The acceptance is responsive to the at least one conditional purchase offer. A payment is provided to the first seller using the payment identifier.

Yet other embodiments of the present invention provide methods and apparatus for facilitating a transaction between a buyer and one of a plurality of sellers via the Internet. A request for quotes for a first product is presented to the plurality of sellers via the Internet. At least one response to the request for quotes is presented to the buyer from at least one of the plurality of sellers. Negotiation between the buyer and the at least one of the plurality of sellers is facilitated via the Internet. According to specific embodiments, the buyer is able to designate products in her shopping list for which postings are requests for quotes and products for which postings are conventional bids.

According to other embodiments, methods and apparatus for facilitating a transaction between a buyer and a first one of a plurality of sellers via the Internet are provided. A plurality of bids from the buyer for a plurality of different products are presented to the first seller. A bundle response from the first seller is presented to the buyer. The bundle response is for a subset of the plurality of different products, and is contingent upon purchase of all of the subset of the plurality of different products.

Methods and apparatus are also described herein for tracking transaction statistics on a transaction site on the Internet. According to these embodiments, transaction data are compiled for a buyer relating to at least one product purchased by the buyer via the transaction site. In one embodiment, the transaction data are presented to the buyer in response to a request from the buyer. According to a second embodiment, the transaction data are associated with market data regarding a current value for the at least one product. The market and transaction data are then presented to the buyer. According to a third embodiment, the transaction data are associated with product data representing at least one related product. Purchase of the at least one related product by the buyer is facilitated.

Further embodiments describe methods and apparatus for tracking transaction statistics on a transaction site on the Internet. Transaction data relating to at least one product are compiled for transactions between a plurality of buyers and sellers via the transaction site. At least one option price relating to the at least one product is determined based on the transaction data. Trading of options relating to the at least one product is facilitated based on the at least one option price. It should be noted that the transaction prices of the present invention may be analogized to stock prices in financial markets. Thus, according to the invention, transaction prices may be used to facilitate the trading of options in a manner similar to the trading of options in financial markets.

According to still further embodiments, methods and apparatus are provided for presenting information via a transaction site on the Internet to a seller regarding a plurality of bids from a plurality of buyers for a plurality of products. A list of the plurality of bids is presented to the seller. Each of the bids identifies an associated buyer and an associated product. In response to selection by the seller of a first product in the list, market information is presented to the seller representing a subset of the plurality of bids, each bid in the subset corresponding to the first product. Alternatively, in response to selection by the seller of a first buyer in the list, a subset of the plurality of bids is presented to the seller, each bid in the subset corresponding to the first buyer. According to a more specific embodiment, a bundle response from the seller is presented to the first buyer. The bundle response is contingent upon purchase of all of a subset of the plurality of products which correspond to the subset of the plurality of bids.

Methods and apparatus are also described for providing a transaction site on the Internet for listing products for sale in which both individuals and corporate entities are represented as sellers. During creation of a first product listing for a first individual, the first individual is asked whether he or she wants the first product listing posted to at least one remote site. Upon receiving an affirmative response from the first individual, the first product listing is posted to the at least one remote site. According to specific embodiments, such remote sites could include Usenet and/or free classified sites.

According to various embodiments, methods and apparatus are provided for facilitating transactions between a plurality of buyers and a plurality of sellers via a transaction site on the Internet. For each of a plurality of actions performed by a first one of the plurality of buyers via the transaction site, an account associated with the first buyer is credited with a corresponding economic benefit. The account is maintained at the transaction site. According to a specific embodiment, the economic benefits accrued in the account are useable by the buyer only in relation to transactions facilitated via the transaction site. According to another embodiment, the economic benefit could be cash or some other from of fungible credit.

Still other methods and apparatus are provided for facilitating transactions between a seller and a plurality of buyers via a transaction site on the Internet. Market information is made available to the seller via the Internet. The market information relates to a plurality of bids from the plurality of buyers for a particular product. An ask price presented to each of the plurality of buyers via the Internet is temporarily lowered in accordance with the market information to induce either acceptance by or further negotiation with each of the plurality of buyers.

Further methods and apparatus are provided for facilitating transactions between a seller and a plurality of buyers via a transaction site on the Internet. A plurality of bids from the plurality of buyers is made available to the seller via the Internet. Automatic responses to selected ones of the plurality of bids are made via the Internet according to response criteria previously specified by the seller. According to various embodiments, the response criteria comprise a plurality of independent rules which may be combined in a plurality of ways to effect responses to the bids. Information corresponding to the response criteria may be stored at the transaction site and/or at a second site remote from the transaction site, access to which is controlled by the seller.

According to further embodiments, methods and apparatus are provided for facilitating a process in a graphical user interface. An active object is presented in the graphical user interface, selection of which initiates the process. In response to selection of the active object, the active object is converted to a display object indicating completion of the process.

According to a various embodiments of the invention, graphical user interfaces are provided for facilitating a variety of functions. According to one embodiment, a graphical user interface is provided for facilitating transactions for a seller via the Internet. The graphical user interface includes a plurality of bids from a plurality of buyers and market information derived at least in part from the plurality of bids.

According to another embodiment, a graphical user interface is provided for facilitating transactions for a buyer via the Internet. The graphical user interface comprises a shopping list for storing product information relating to a plurality of products which meet product criteria specified by the buyer. The shopping list includes objects therein for enabling the buyer to negotiate with any of a plurality of sellers for selected ones of the plurality of products. It also allows buyers to add comments for any product or seller represented in the list. According to various embodiments, each shopping list associated with the buyer may contain an unlimited number of products or sellers. Shopping lists may also include mechanisms by which buyers may indicate whether the items in the list are independent or part of a mutually exclusive group. Buyers may also indicate that they want to solicit offers from sellers for any item/seller which is added to the list.

According to yet another embodiment, a graphical user interface element is provided which is an active object, selection of which initiates a process. The active object is converted to a display object indicating completion of the process in response to selection of the active object.

A further understanding of the nature and advantages of the present invention may be realized by reference to the remaining portions of the specification and the drawings.

BRIEF DESCRIPTION OF THE DRAWINGS

FIGS. 3–18 are a series of graphical user interfaces illustrating the operation of a specific embodiment of the invention.

DESCRIPTION OF SPECIFIC EMBODIMENTS

Figure 1:
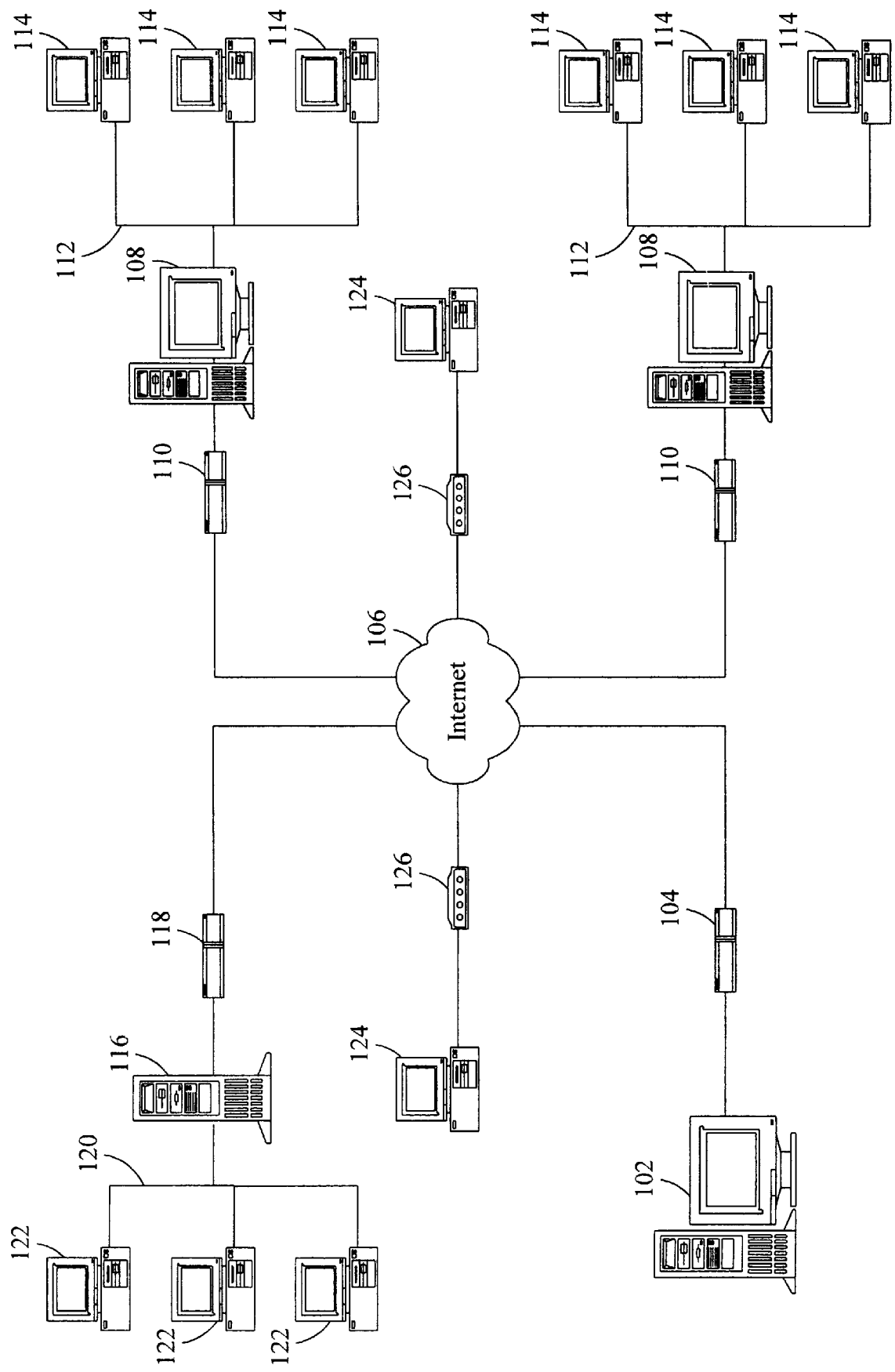
FIG. 1 is a block diagram of a hardware environment in which the various embodiments of the present invention may be implemented.

FIG. 1 is a block diagram of a hardware environment in which the various embodiments of the present invention may be implemented. The web site at which transactions between buyers and sellers are facilitated according to the invention is located on a server 102 which is connected by a router 104 to the Internet 106. Sellers (represented by servers 108) are connected to the Internet via routers 110. Seller servers 108 may have networks 112 associated therewith interconnecting a plurality of personal computers or work stations 114. Buyers (represented by computers 122 and 124) may be connected to the Internet in a variety of ways. For example, a buyer may be connected from his home via a lo modem 126, or from his workplace via a network 120, a file server 116, and a router 118. It will be understood that, according to various embodiments of the invention, buyers and sellers may gain access to the web site on server 102 via a variety of hardware configurations. For example, a seller may be an individual on his home computer 124. Similarly, a buyer may be an employee may be at his computer 114 at a corporation which is also a seller. It will also be understood that the hardware environment of FIG. 1 is shown for illustrative purposes and that a wide variety of hardware environments may be employed to implement the various embodiments of the present invention. It should also be understood that specific embodiments of the methods and processes described herein are implemented as computer program instructions, i e., software, in the memory of server 102.

Figure 2:
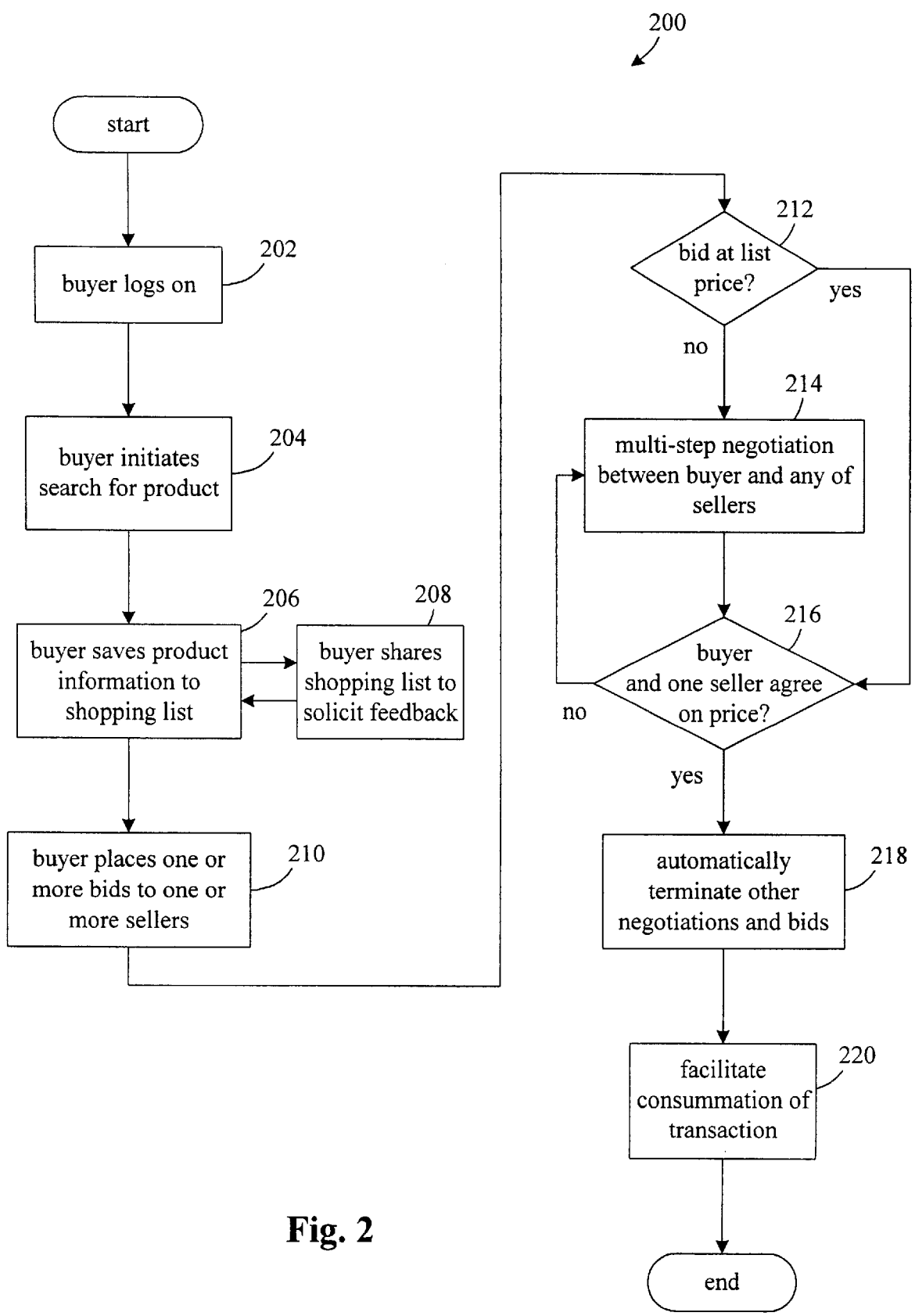
FIG. 2 is a flowchart illustrating facilitation of a transaction according to a specific embodiment of the invention.
Figure 2A:
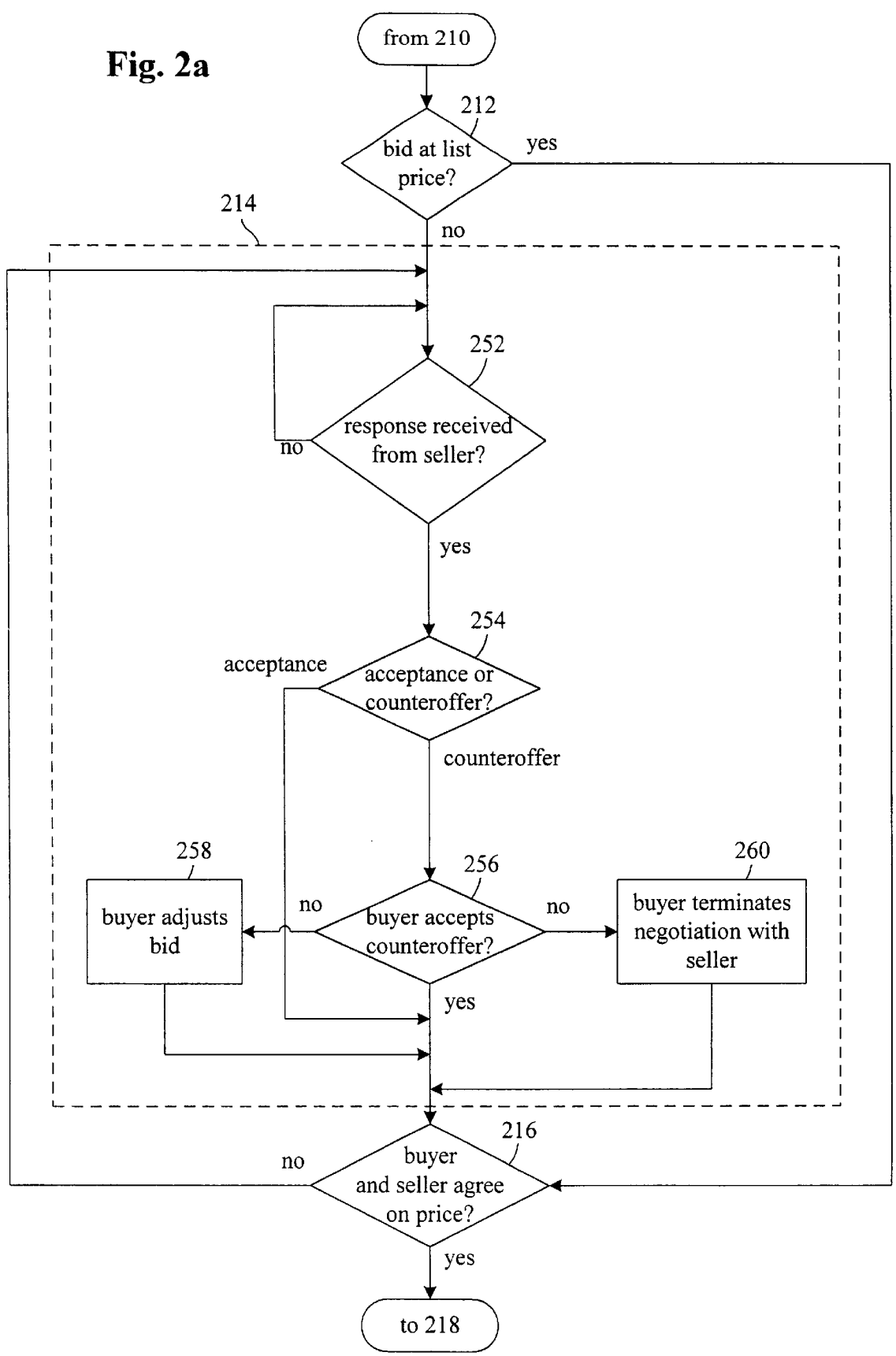
FIG. 2a is a flowchart illustrating a negotiation between a buyer and a seller according to a specific embodiment of the invention.

The operation of a specific embodiment of the invention will now be described with reference to FIGS. 2–18. FIG. 2 is a flowchart 200 illustrating facilitation of a transaction according to a specific embodiment of the invention. FIG. 2a is a flowchart illustrating a multi-step negotiation between a buyer and a seller (see 214 of FIG. 2) according to a more specific embodiment of the invention. FIGS. 3–18 are a series of graphical user interfaces which will be used to illustrate the transaction process of FIGS. 2 and 2a.

Initially, a buyer logs on to the transaction facilitation system of the present invention (202) via login interface 300 of FIG. 3. This results in presentation of a personalized private interface 400 to the buyer in which the buyer may initiate a search for a particular product (204). According to various embodiments, a buyer need not log on to the site before initiating a search. That is, searching may be initiated by individuals who are not members of the transaction site. According to such embodiments, logging in is only required for bidding, negotiating, transacting, etc. To focus the search, the buyer may specify the product type as, for example, a laptop computer as shown in interface 400 of FIG. 4. The buyer may further specify the type of laptop (e.g., ThinkPad® 600) to varying degrees of specificity in the Keyword(s) window. More advanced searching options are also available for more skilled users and more focused searches in which a variety of product criteria may be specified.

When the buyer finishes specifying the product and clicks on "Go," a search of a proprietary database is initiated in response to which relevant product information is presented in the form of a list of products as shown in interface 500 of FIG. 5. Each entry in the list includes the manufacturer, specific product information, and a product price (e.g., the "Lowest Price" column which displays the lowest list price from among the sellers selling the specific product via the transaction site). It should be noted that the term "ask price" as used herein encompasses any price for which a merchant is offering a product for sale including, for example, the list price and subsequent counteroffer prices. The term "list price" is used herein in its conventional sense in that it generally refers to an original price associated by the merchant with a product. As mentioned above, and according to a specific embodiment of the invention, when the list of products shown in interface 500 is initially presented, the price shown for each entry is the lowest list price for the product from among the sellers selling through the transaction site.

Also included with each entry is a "Save" button by which the buyer may save any of the list entries to any of his personal shopping lists (described below) from which transactions may be initiated. Alternatively, transactions may be initiated directly from the search results list. As shown in FIG. 6, when any of the active "Save" buttons in the product information list of interface 500 are activated, i.e., the buyer clicks on them, the associated product information is saved to the buyer's currently selected shopping list (206) and the active "Save" button becomes a display object indicating that the associated item has been saved. Additional information about any of the products in the list of interface 500 may be obtained by clicking on the HTML text describing the product. According to a specific embodiment, creation of such a shopping list may be accomplished without logging in to the transaction site. However, the entries in such a list are not permanently saved and transactions may not commence until the user logs in.

According to various embodiments, a buyer can create and simultaneously maintain as many shopping lists as desired. Moreover, for each shopping list created, the buyer may specify a variety of attributes which affect the way in which each shopping list is used to facilitate transactions. For example, the buyer may specify whether the entries of a particular shopping list are independent of each other or whether they form a mutually exclusive group as described herein. If the buyer specifies that the entries are independent, then the bids and deals associated with any one entry have no effect on ongoing negotiations for other items in the list. In addition, the buyer may specify whether a particular item will automatically solicit quotes from a plurality of sellers once a corresponding entry is added to one of the buyer's shopping lists. The buyer may also customize each shopping list by, for example, giving each list a meaningful name, or by associating comments with each.

Interface 500 also includes an advanced search interface in which specific parameters associated with the specified product type may be specified. In the example shown, for the product type "Laptop" the processor, the display size, and the speed may be specified to further refine the search.

The shopping list to which the buyer saves selected portions of the product information is shown in interface 700 of FIG. 7. The shopping list includes the information from the search results list of interface 500. In addition, a "Comments" feature is provided which allows the buyer or other individuals authorized by the buyer to insert personal comments regarding each specific product or merchant. Such comments could include full text messages or, for example, product or merchant ratings. Insertion of comments by the buyer is effected by activation of a "Comments" button in each shopping list entry. This results in presentation of window (not shown) in which new comments may be entered or old comments edited.

Insertion of comments by other individuals may be accomplished in different ways according to various embodiments of the invention. According to one embodiment, the buyer may e-mail an HTML page including the shopping list to one or more individuals in a reviewer network to solicit comments (208). The individuals receiving the shopping list may view the page using their Internet browser and, through an HTML link in the page, access the transaction web site as a user authorized to add comments to the buyer's shopping list. As discussed above, these comments may be full text messages regarding anything relevant to the listed product or merchant. Comments may also take the form of a rating of the product or merchant according to a scale automatically provided to the reviewers in the reviewer network. According to specific embodiments, the system of the present invention automatically compiles ratings from the buyer and reviewers to create indices which may be used for decision making.

Alternatively, the reviewer may insert comments into the HTML page and e-mail it back to the web site for automatic entry into the buyer's shopping list. According to another embodiment, the buyer gives permission for others in his reviewer network to review one or more of his shopping lists by specifying a plurality of e-mail addresses for each shopping list. The buyer may then exchange comments about various products and merchants via an interface on the web site with his reviewers and others who have been authorized to review by that buyer.

Activation of the HTML text describing a product entry in the shopping list of interface 700 results in presentation of an interface 800 (FIG. 8) which provides information about all merchants offering the particular product for sale through the transaction site. The first entry in the list corresponds to the shopping list entry selected in interface 700. Any of the entries in interface 800 may be saved to the original shopping list of interface 700 by activation of the associated Save button.

As can be seen, the buyer may submit an individual bid to a particular seller for the listed product (210) by entering the bid amount in the Bid column and activating the associated Bid button. According to specific embodiments, password verification is requested when the Bid button is activated to ensure that the bid is authentic and authorized. The buyer may accept the seller's current ask price (which may or may not be the same as the list price) by activation of a button indicating "Buy." According to various embodiments, password verification is also required prior to sending such a response to the buyer. Bids for varying amounts may be submitted to different merchants as shown in expanded shopping list interface 900 of FIG. 9. The individual bids submitted via interfaces 800 and 900 are shown in the shopping list in an updateable and interactive column entitled "Bid Price." It should be noted that implementation of the present invention does not require that password verification be employed for every transaction. That is, such password verification may only be required for some actions such as, for example, initially logging into the system.

Also included in interface 900 is a column entitled "Comments" by which direct messaging between the buyer and the seller may be effected. As part of the bid submitted to the seller, the buyer may include full text messages through activation of the associated "Comments" button. The buyer may also indicate a length of time for which the associated bid is good, i.e., an expiration time. Alternatively, a buyer could indicate that the bid is "good to cancel," i.e., that the bid is valid until cancelled by the buyer. As another alternative, the bid could be specified by the buyer as a "fill or kill" bid, i.e., only responses for the exact product and quantity requested will be entertained. In one embodiment, these bid parameters are implemented using a column next to the bid price (not shown) where the user indicates the life of the bid. It should be noted, however, that a variety of mechanisms may be used without departing from the scope of the invention. According to various alternate embodiments, the shopping list includes other mechanisms by which these parameters may be specified and communicated to sellers. According to specific ones of these, the mechanisms by which such bid attributes are communicated are such that they are recognized by the automatic response algorithms employed by sellers on the transaction site.

The seller may respond to the messages with full text messages of its own. This allows both parties to the negotiation to move forward with more specific information. According to a specific embodiment, the seller may input such messages via its own interface as described below. According to another specific embodiment, the seller's comments are presented to the buyer in a window which appears upon activation of the "Comments" button of interface 900 along with comments from any reviewers in the buyer's reviewer network. The seller's comments could also appear in conjunction with a response generated either by the seller, its representative, or a program active on behalf of the seller.

Submitted bids which do not constitute acceptances of the sellers "Ask Price" (212) are made available to individual merchants along with quote solicitations via another set of interfaces on the transaction web site. From this point, a multi-step negotiation between the buyer and each seller may commence (214). The details of such a negotiation will be described with reference to FIG. 2a. When a representative of a member merchant logs in to the transaction web site using interface 1000 of FIG. 10, currently outstanding bids and/or quote solicitations are listed according to a filter or filters specified by the merchant (see interface 1100 of FIG. 11). For example, the merchant may elect to view bids to all merchants, to a particular subset of merchants, or only bids to that particular merchant. The merchant may also filter the list to show only bids or quote solicitations for certain products. The merchant may also specify that only bids within a certain percentage or dollar value spread be listed. In this example, the bids are sorted according to a buyer identification number shown in the "Buyer Id" column, the bids submitted by the buyer of interface 900 corresponding to buyer 147. In general, the merchant or its representative may use a variety of filters in combination to generate a list of particular product-buyer combinations which are currently open. It should be noted that the entries in interface 1100 may also include items saved in buyers' shopping lists for which bids or quote solicitations have not yet been submitted.

Once the seller selects a product in interface 1100 the seller can respond in a variety of ways. That is, the seller can accept the specific bid or make a specific counteroffer to the bidder corresponding to the selected product. The seller can also make block responses (in the form of deals or counteroffers) to all or some subset of buyers who have posted bids or quote solicitations for the selected product.

In addition to the bid listing, market information may be provided with interface 1100 which the merchant may use to formulate strategies for responding to any or all of the outstanding bids. For example, a demand curve for a particular product, e.g., the ThinkPad® 600, may be shown. Other market information might include price histories, bid histories, deal histories, etc. Moreover, the market information may be presented in a variety of forms such as graphically, in tables, in lists, and the like.

An example of how a merchant might use such market information will now be described. The merchant may use demand data to effect a block response. That is, the merchant can use the data to determine how much to temporarily lower its ask price to induce acceptance by a specific number of buyers. According to a specific embodiment, the merchant effects a block deal by temporarily lowering its ask price to a particular buyer to match the bid price submitted by that buyer thereby inducing acceptance by that buyer. Because the merchant's response is made in the context of a block deal, a number of responses are automatically generated to other buyers who have submitted bids at or above the particular buyer's bid thereby inducing acceptance. According to a specific embodiment, the ask price of the automatically generated responses correlate to or match the bid price of each of the other buyer's bids rather than the bid price of the particular buyer to whom the merchant specifically responds. It should be noted that, as with other aspects of the present invention, the merchant may respond to bids directed to the merchant as well as bids directed to other merchants.

According to a particular embodiment, when the merchant logs on to the system all bids currently outstanding to that merchant for a variety of products are shown in the format of interface 1100. The merchant may then select a particular product in the product column to view all currently outstanding bids for that product either to the merchant or to a plurality of merchants. The market information presented will be adapted according to the particular view. The market information may be employed by a particular merchant in a variety of ways for decision-making support. A particular use would depend upon the nature of the information. As described above, demand data could be used to effect block deals. Demand data or the price history for a particular product could be used to make adjustments to the merchant's list price. It will be understood that there are a wide variety of ways in which such market information could be used to enhance a merchant's decision making which are within the scope of the present invention.

According to another embodiment, instead of selecting a particular product, the merchant may select a particular buyer identified in the buyer column, in response to which all bids and/or quote solicitations from that buyer currently outstanding in the system to any merchant are presented to the merchant in a format similar to that shown in interface 1100. This may also include products which have been saved to one of that buyer's shopping lists and for which the buyer has not yet posted a bid but has indicated that she is willing to solicit quotes. This allows a merchant to offer bundle deals to particular buyers when such buyers are identified. For example, a buyer might be bidding on a laptop computer, extra battery packs, a printer, and a carrying case. The merchant may respond to the buyer with a bundle bid or counteroffer which reduces the ask price for any or all of the items if the buyer chooses to buy all of those items from that merchant. This gives merchants a very powerful tool for negotiating with individual buyers. The merchant selects the items in the buyer specific list which he would like to include in the bundle and either quotes individual ask prices to the buyer for the selected items, or a single price for all the products in the bundle. According to a specific embodiment, the individual quotes (i.e., ask prices) are prefixed with a letter "B" identifying them as part of a bundle. The seller can also offer to sell related (competitive or complementary) products as part of the bundle. The seller can thus suggest products to the buyer on which he can offer good deals. This "cross selling" allows the seller to make deals on products even where such products are not originally identified by the buyer.

As described herein, a buyer may define mutually exclusive groups of the same or similar products only one of which is desired by the buyer. According to a specific embodiment, this is achieved by the buyer designating a particular shopping list listing the products as a mutually exclusive group. Once such a group is defined, a buyer may bid on a slumber of ThinkPad® 600 and 700 computers even though she only wants one. By identifying the computers (and thus their associated bids or quote solicitations) as part of a mutually exclusive group, the buyer activates a feature of the present invention which terminates negotiations for all other products in the group when the buyer has reached an agreement on any product in the group. It will be understood that, in the context of the bundle bid, this information would be useful for the merchant. Therefore, according to a specific embodiment of the invention, when a merchant is attempting to effect a bundle bid or counteroffer, the merchant is enabled to identify which of the bids and/or quote solicitation associated with the buyer are part of a mutually exclusive group. According to a specific embodiment, in the list of bids and/or quote solicitations associated with a particular buyer, an entry is associated with each which identifies the product as part of such a mutually exclusive group. This could be an entry in a column dedicated for this purpose, or as, for example, a prefix associated with each product which is part of such a group.

According to one embodiment of the invention, market information (not shown) is made available to individual buyers in interface 900 to help them develop bidding strategies. As discussed above with regard to market information presented to a merchant, such information could include demand data, list price histories, bid price histories, deal price histories, etc. The information can be filtered with respect to particular products and particular merchants. A price history might include the minimum, maximum and median list prices offered by a particular merchant for a particular product. A price history might be used by a buyer to predict, for example, how much the price for a product might drop in the future. That is, the buyer might use the historical price decay to predict price decay for an upcoming period. For a new product, i.e., a product which has no price history, the buyer will have the option of identifying a similar product and using the price history data for that product.

Alternatively, the system of the present invention may automatically determine one or more similar products in response to a buyer requesting market information for a new product. According to a specific embodiment, the similar product may be determined with reference to a mutually exclusive group defined by the buyer. Automatic identification of a similar product could be enabled by identifying similarity in brand name, category, or data regarding what products buyers and/or sellers have identified as equivalents in the past. A technique known as collaborative filtering may be used to identify similar products using such information. Where more than one similar product is identified, a list of the similar products is presented to the buyer from which the buyer may select the product he believes is the most similar to the product for which market information is desired.

A deal history might include prices at which a particular merchant or a plurality of merchants has sold different volumes of a particular product. Such deal prices could include deal prices for transactions effected through the transaction site by the merchant or merchants. The deal history could also include deal prices for transactions effected outside of the transaction site and provided to the transaction site by the individual merchants. All of this market information provides powerful tools for a buyer to determine how much she wants to bid for a particular product.

According to a specific embodiment, good deals are identified for the buyer based on a variety of market-related heuristics. Such heuristics include, for example, the ratio of the (median-minimum merchant price for a product) to the median product price. Another heuristic could be the price drop (or the price drop for the lowest price) over a recent period (day, week, month, etc.) expressed as a percentage of the median or lowest price. These deals could be identified for the buyer on a special area of the main page or a special page of the transaction site. Alternatively, the good deals are extracted from the buyer's search results. Even more specifically, the buyer has the option of sorting his search results using the available heuristics to order the product listings according to how good the individual deals are. It should be noted that a variety of heuristics may be used to identify "good deals." For example, the difference between the lowest price and the second lowest price could be used to indicate just how good of a deal is being offered by the seller offering the lowest price.

The merchant may effect a manual response to an individual bid (252) by selecting the corresponding entry in interface 100. The bid need not be directed to the merchant. It may, in fact be directed to another merchant. That is, not only does each merchant have the opportunity to view bid information to other merchants, each merchant may also respond to such bids. According to a specific embodiment, the bid information relating to other merchants does not identify the merchants to which individual bids are directed. A negotiation between the buyer and the second merchant may then take place as described herein. In any case, selection of a particular entry in interface 100 results in presentation of trading interface 1200 of FIG. 12 to the merchant by which the merchant may either accept the bid price or submit a counteroffer to the buyer by changing the ask price for that buyer. Other information included in interface 1200 includes details about the buyer including, for example, the buyer's e-mail address and any other information authorized for release by the buyer. Note that the merchant may effect a block deal by specification of the block ask price in interface 1200. The seller may insert comments to the buyer in conjunction with the bid response such as, for example, an expiration time for the new ask price. The expiration time may also be indicated through an additional field (not shown) the contents of which may be intelligently processed by the system of the present invention to effect automatic removal of the ask price at the appropriate time. In addition and as shown, market information regarding the current bids may be provided in interface 1200.

The seller may also authorize automated responses to bids (252) by specifying a number of business rules to govern the responses using interfaces 1300–1320 of FIGS. 13a–13k. According to the present invention, any number of business rules may be defined by the seller and may be executed in any sequence specified by the seller. For each rule, the seller defines a set of criteria and a set of actions to be taken when the set of criteria is satisfied. Any number of criteria may be defined and combined in a variety of ways using logical operators (e.g., AND, OR, NOT) and groupings. Examples of criteria include (but are not limited to) bid-list spread, product type or group, the number of units, the buyer's reputation, etc. Similarly, any number of actions may be specified. Examples of actions includes (but are not limited to) text responses, ask price reductions, bid acceptance, etc. Another possible action could be generation of an e-mail message to one or more e-mail addresses. This can ensure that the appropriate representative(s) of the seller can be made aware of attractive sales prospects as soon as they are available at the transaction site. The e-mail(s) can ensure this without requiring the seller's representatives to continuously monitor the transaction site. This is especially useful during the early stages of the transaction site when it has relatively low traffic and hence cannot justify continuous monitoring by the seller or its representatives. The seller may reach the various Business Rules interfaces by selecting the corresponding HTML link at the top of interface 1200. In interfaces 1300 and 1302, respectively, the seller may specify a percentage or dollar value spread relative to the current list price within which a response will be automatically given. That is, if a bid is not close enough to the list price, no response may be given. The amount by which the list price may be reduced may also be specified as a percentage of the current list price. Product specific and buyer specific response may be added via interfaces 1304 and 1306 to address issues related to specific products, or to favor preferred customers. Other information may be conveyed to the buyer as part of an automated response by means of a text entry box entitled "Text Response." As shown, the text could indicate an expiration period for the bid response.

FIGS. 13e through 13k show alternative interfaces for specifying and modifying business rules. As shown in interface 1308 of FIG. 13e, existing business rules are accessed through a list window entitled "Current Business Rules". Rules may be added and deleted from the list using the "Create New Rule . . . " and "Delete Current Rule . . . " buttons. The currently highlighted rule in the "Current Business Rules" window is specified in a window with the title of the current rule at the top of the box as shown. A variety of criteria are specified using the "add criteria" button as will be discussed below. A variety of actions to be taken if the criteria are satisfied are also specified using the "add action" button. In the rule illustrated in interface 1308, if a product which is the subject of a particular bid is part of a Hi Inventory product group (previously specified by the seller by selecting the HTML text "product set") and the bid-list spread is greater than or equal to 50%, the action taken is to is respond to the bidder with the text message "Please be serious—your bid is less than half our list price." Similarly, in interface 1310, if the bid-list spread is between 10 and 50%, the actions taken are to reduce the ask price by 10% and present the text message "We have a great deal for you—we can offer you a 10% discount." Finally, as shown in interface 1312, if the bid is within 10% of the list price, an acceptance message is transmitted to the bidder. Other criteria could be specified such as, for example, the number of units bid upon (interface 1314). In addition, any combination of criteria may be specified Such as, for example, the number of units, the bid-list spread, and the buyer reputation (interface 1316).

The mechanism by which a new business rule may be created will now be discussed with reference to interfaces 1318 and 1320 of FIGS. 13j and 13k. In response to selection of the "Create New Rule . . . " button, a blank rule box is presented (interface 1318) in which the seller may specify the title of the rule, the criteria which must be true for action to be taken (using the "add criteria" list), and the actions to be taken (using the "add action" list). Many different combinations of criteria may be specified and different combinations of actions may also be specified. In the example shown in interface 1320, the criteria specified include the buyer reputation and the number of units, while the actions specified include reducing the ask price by 10% and displaying a text message. So, if a buyer with a highly rated reputation bids on more than 10 units, according to the new rule, the ask price is reduced by 10% and a text message is presented stating, "Because of your excellent reputation, we are able to offer you a 10% volume discount." According to a specific embodiment, the business rules of the present invention automatically ensure that, regardless of the way in which a seller specifies its rules, the ask price will never be reduced below the bid price. That is, even where a 10% reduction in ask price is specified in the seller's rule, the actual price reduction may be less where the bid is within 10% of the original ask price.

In addition, the merchant may specify response behavior which employs the market information from interface 1100. For example, an automated block deal response may be specified. Business rules may also be specified in a manner which takes into account specific attributes of individual bids. For example, the seller's response to a bid may be made contingent upon the number of units requested in the bid. This allows sellers to automatically give volume discounts.

A variety of complex rules may be specified so that automated responses may be given to the majority of outstanding bids, even bids to other merchants. Rules may be combined in various ways and multiple rules based on different criteria may be simultaneously applied. According to specific embodiments of the present invention, business rules may be linked to files external to the transaction site at, for example, the merchants own file server. Such rules might incorporate proprietary information over which the merchant wishes to maintain control. For example, if a particular merchant wishes to employ a specific subset of rules for products on which the merchant has a 10% gross margin, the rule determination for a particular bid would require current information regarding the gross margins for the merchant's product line. Understandably, this is information which a merchant might want to maintain as confidential.

Thus, even though the seller may not be willing to share his gross margins with the transaction site, he might still be willing to query his database and identify all the products that meet his requirements for gross margins (or any other criteria like inventory position) and then save the list of products into a file. The seller can then upload this file containing the list of products to the transaction site so that the list could be used with business rules specified by the seller. The seller could also place this file on the Internet and allow the transaction site to get access for use with business rules. It should be noted that in a similar way the seller can also create lists for buyers (buyer sets) that identify list of buyers and then allow the transaction site to access these lists for use with the seller's business rules. By specifying links to the confidential or proprietary information in its business rules, the merchant can maintain the information on its own site while also using it to automatically effect transactions at the transaction site. It will be understood there are myriad rules which may be applied and combined according to the specific goals of a particular seller and that the examples given above are merely illustrative and should not be used to limit the scope of the invention.

Not only may the buyer receive a manual or automated response from the seller to which the bid was intended, he may also receive a response from another seller who had access to the buyer's bid information via their own private interface. In fact, according to specific embodiments of the present invention, some powerful market enhancements are made possible by enabling sellers to respond to buyer' bids in a flexible manner. For example, a seller could respond to a bid to itself or another seller for a first product by offering a better deal on comparable competitive product. This would allow a seller to compete for sales where it does not carry the specific product to which the bid was originally directed. It also allows sellers to offer preferred products which closely match or exceed the performance or specifications of the product in the original bid.

Another market enhancement made possible by providing other seller' bid information and allowing flexible bid responses is related to the creation of bundle responses by the seller. As discussed above, a seller may create a bundle response from currently outstanding bids by a particular buyer. In addition and according to a specific embodiment of the invention, a seller may respond to a bid to itself or another seller with an offer for a related product. So, for example, if a buyer is bidding on a laptop computer, the seller can offer the buyer a carrying case for the laptop or extra battery packs at a reduced price, or even at no additional cost. This allows the seller to create a bundle which includes the product for which the buyer is bidding and one or more related products. Thus, the seller can identify and target markets for specific products without having to rely on the consumer's knowledge of or motivation to bid on such related products. The seller can also leverage its inventory in the related products to effect sales of the primary product.

Where the seller's response is a counteroffer (254), the counteroffer price appears as a modified ask price in both the merchant's bid list of interface 1100 and the buyer's shopping list of interface 900 as shown in FIGS. 14 and 15, respectively. According to a specific embodiment, entries in the shopping list of interface 900 for which a response has been received from the seller are highlighted in a contrasting color as shown. Where the buyer does not accept the seller's counteroffer, he may adjust his bid by entering a new bid price as shown in FIG. 16. By activating the "Bid" button for that entry in his shopping list the buyer then submits an adjusted bid (258). Note that because the bid has been adjusted, it is treated like a new bid and the entry is no longer highlighted. Alternatively, the buyer may terminate negotiations with the seller at any time (260). In any case, where the buyer and seller have not yet agreed on a price (216), additional rounds of negotiating may take place as described above.

If the buyer accepts the seller's ask price in interface 900 by activating the "Buy" button (212) or the seller accepts the buyer's bid price in interface 1200 of FIG. 17 (254), i.e., the buyer and seller agree on a price (216), all other negotiations relating to a mutually exclusive group associated with the product for which an agreement was reached are automatically terminated (218). That is, the availability to any sellers of the buyer's outstanding bids or quote solicitations (which are part of the mutually exclusive group defined by the buyer) is terminated. According to a specific embodiment, the buyer can enable this feature by specifying which of a plurality of currently ongoing negotiations should be part of a mutually exclusive group in which all negotiations are automatically terminated when an agreement in any one of the negotiations is reached. Any number of mutually exclusive groups each relating to one or more products may be associated with a particular buyer in accordance with the goals of that buyer. According to a specific embodiment, the buyer may use the shopping list of the present invention to define the mutually exclusive groups. That is, as described above, the user may designate a shopping list as such a mutually exclusive group such that the bids submitted from that shopping list will be processed in accordance with the mutual exclusivity feature of the present invention. Alternatively, the products in a particular shopping list may be designated independent of each other in the case where, for example the buyer is interested in all of the products in the list.

The mutual exclusivity feature of the present invention has significant value for the buyer even where negotiations are non-binding because it will serve to protect the buyer's reputation. That is, as described herein, a buyer's reputation is tracked based on previous transaction behavior, especially with regard to the number of bids honored or reneged upon by the buyer. Mutual exclusivity provides a mechanism whereby the buyer may generate a number of non-binding bids without the risk that her failure to pursue some of those bids would sully her reputation.

After a deal has been made, the entry is highlighted in the buyer's relevant shopping list in interface 900 (FIG. 18), the date of the agreement is displayed in the "Purchase Date" column, and consummation of the transaction is facilitated (220). According to various embodiments, the buyer need only select HTML text in the "Merchant" column in interface 900 in the appropriate shopping list entry to go directly to the merchant's web site for consummation of the transaction. According to other embodiments, the transaction may be consummated at the transaction site using private interfaces between the merchant and the buyer. According to still other embodiments, the buyer's payment and shipping information is provided to the seller by the transaction site upon authorization by the buyer. This information may be acquired by presenting an input interface to the buyer requesting the information, or, alternatively, from a database of previously collected information concerning the buyer.

In one embodiment of the invention, individual buyers are given incentives to influence prospective buyers to use the transaction web site on server 102. That is, the buyer submits a confidential list of e-mail addresses (or sonic other appropriate identifier) to the transaction web site. Transactions on the web site are monitored and some sort of economic benefit is automatically accrued to the buyer each time one of the prospective buyers on his list engages in a transaction. The economic benefit could be, for example, cash or transaction site "dollars", or discounts on future transactions. According to specific embodiments, both the number of people identified by the buyer in his list and the total amount of economic benefit accrued in a given period of time are limited. According to various embodiments, a buyer may only list individuals who are not currently users of the transaction site. That is the buyer may only benefit from the transactions of individuals who become users of the site after the buyer lists them.

According to various embodiments of the invention, incentives are provided not only to encourage buyers to influence others to use the transaction site, but also to make it attractive for current users to continue using the site. For example, accounts are created for each registered user in which virtual "dollars" are kept. These virtual dollars are a currency unique to the transaction site which may be used against purchases effected through the transaction site. As discussed above, one way of accruing virtual dollars is through transactions engaged in by a list of influences. Some percentage of a buyer's own transactions could also be credited to his account. In addition, a buyer could be offered virtual dollars for providing specific information in an online form for the administrator of the site or one of its marketing partners. For example, a buyer could be asked if he would mind filling out a credit card application form for a specific number of virtual dollars. These virtual dollar credits accrue to the buyer simply for filling out the form, regardless of whether or not an associated transaction is consummated. Moreover, the accrued credits may be used in any of a variety of ways at the transaction site at any time chosen by the holder of the credits. This is in contrast with features at various sites in which a credit is only applicable to a current transaction and only where the transaction goes through.

While the examples herein have been described with reference to a merchant entity having its own web site, it will be understood that a seller need not have a web site to effect transactions according to the present invention. In fact, according to various embodiments, it is possible for a merchant to be hosted by the transaction site described herein (e.g., server 102 of FIG. 1) and to conduct all of its business through the transaction site without having its own web site, wholesale, or retail facilities. Even individuals may act as sellers on specific embodiments of the transaction site of the present invention. Such individuals could list new or used items to the transaction site's database which, when satisfying a buyer's search criteria, would be listed alongside the similar products of merchants of all sizes. This allows sellers of all sizes to vie for customers on a relatively equal footing. It also allows buyers to see prices from a wide variety of sellers, even those without e-commerce enabled web sites.

Allowing individuals to act as sellers on the transaction site and post what are essentially classified ads makes other features of the present invention possible. For example, individual posting such classifieds to the transaction sites are given the option to automatically post the listing in an appropriate format to other free locations which are appropriate for the posting of such messages. For example, when specifying a listing on the transaction site of the present invention, an individual may select options which result in the automatic posting of the listing on Usenet or any of a wide variety of free classified sites. According to a specific embodiment, the postings are made in the name of the individual and contain hypertext links back to the transaction site. It is important to note that this type of posting would not qualify as SPAM in that they are posted by individuals and only on sites appropriate for such postings.

According to a specific embodiment of the invention, a buyer need not even submit a bid to begin negotiations with one or more sellers. Instead, the buyer may submit a request for quotes from sellers for a particular product or bundle of products. According to a specific embodiment, this may easily be accomplished by the buyer through the creation of a shopping list for the product or bundle of products, and designating the shopping list as one for which quotes are automatically solicited. According to specific embodiments, this could be the default for all new shopping lists. Alternatively, the buyer could be required to select this option when creating a new shopping list. This feature allows the buyer to make the sellers do the work. Once quotes are received by the buyer, negotiations can proceed in the manner described above. According to one embodiment, the request for quotes may be submitted via a shopping list created by the buyer as described above. That is, the buyer may create a specific shopping list for which the may select a "Request for Quotes" option in response to which a request for quotes is generated and posted for each of the items in the list. In a more specific embodiment, the buyer has the option of specifying particular sellers from which quotes are desired.

Other features of the present invention involve the concept of post-purchase tracking. According to one embodiment, data are compiled for the buyer across all products purchased through the transaction site. For example, data could be compiled for order numbers, product numbers, dollars expended on particular products or for all products. This feature is particularly valuable for a corporate buyer to keep track of inventory and spending.

According to other embodiments, individual products in a post-purchase list associated with a particular buyer are linked with lists of related products which would allow a buyer to subsequently upgrade the purchased product or to purchase add-on items. Once the linked list is presented to the buyer, negotiation for any of the products in the list may proceed in the manner described above.

According to still other embodiments, individual products in a post-purchase list associated with a particular buyer are linked with market data regarding the current value of those products. Associated hypertext links are also provided allowing the buyer to turn around and offer the product for sale. This subsequent resale may occur after the useful life of the product for that user, or immediately after the initial purchase. As will be understood, this feature enables speculation by the buyer in any of the products offered for sale through the transaction site.

In addition, the transaction site of the present invention can track all of the data necessary for the creation and trading of options at the transaction site. The fact that there may be many different list prices for a particular product is dealt with by using some sort of formula or default value which uniquely identifies a product price. For example, the median list price at the transaction site could be the value upon which the options are based. Alternatively, deal price data may be used, According to yet another alternative, some minimum price could be established by the transaction site.

While the invention has been particularly shown and described with reference to specific embodiments thereof, it will be understood by those skilled in the art that changes in the form and details of the disclosed embodiments may be made without departing from the spirit or scope of the invention. For example, operation of a specific embodiment of the present invention has been illustrated herein with reference to a hypothetical transaction between a buyer and seller. It will be understood, however, that specific transactions will likely differ considerably from the example described without departing from the scope of the invention. Moreover, specific embodiment have been described herein with reference to a web site on the World Wide Web. It will be understood that the other embodiments of the invention may be implemented in any of a wide variety of network environments.

Additionally, the negotiations described above have been described largely as a non-biding process until after a mutually agreeable price has been found and the parties decide to consummate the deal. However, it will be understood that negotiations may be made partially or fully binding without departing from the scope of the invention. That is, a payment identifier such as, for example, a credit card or billing account may be requested before a party is allowed to negotiate. If the party attempts to terminate negotiations prematurely, some sort of penalty may be assessed to the identified account.

Finally, many of the embodiments of the present invention have been described in a context in which a transaction site acts as an intermediary between buyers and sellers. However, it will be understood that the scope of the present invention also encompasses negotiations, transactions, and other various features described herein when occurring directly between a buyer and a seller on, for example, the web site of the seller. These features include (but are not limited to) shopping lists, mutual exclusivity, request for quotes, buyer reputation, demand curve creation and use, block responses, bundle bid creation, cross-selling and all other aspects of the invention described above.

Conceivably, any seller selling products at list prices on the Internet could get additional value by enabling negotiations and other related features as described herein. It is therefore important to note that the scope of this invention includes all of the features described herein, even where these features are enabled at the web sites of sellers who directly sell products to buyers. Therefore, the scope of the invention should be determined with reference to the appended claims.

What is claimed is:

1. A computer-implemented method for facilitating a transaction between a buyer and one of a plurality of seller via a network, the method comprising:

enabling the buyer to generate a shopping list identifying at lest one product associated with the plurality of seller, each entry in the shopping list corresponding to one of the at least one product and a corresponding one of the plurality of seller;

identifying the shopping list as a mutually exclusive group in response to receiving input from the buyer via the network, the mutually exclusive group including each entry in the shopping list;

enabling the buyer to negotiate substantially simultaneously with the plurality of sellers in the mutually exclusive group via the network; and when an agreement is reached between the buyer and a first one of the plurality of sellers in the mutually exclusive group, automatically terminating negotiations between the buyer and others of the plurality of sellers in the mutually exclusive group.

2. The method of claim 1 wherein enabling the buyer to negotiate comprises:

presenting via the network product information relating to a plurality of products meeting product criteria specified by the buyer, one of the plurality of sellers being associated with each of the products;

making a plurality of bids from the buyer for selected ones of the plurality of products available via the network to the plurality of sellers, selected ones of the plurality of bids corresponding to the mutually exclusive group; and presenting at least one bid response via the network to the buyer from any of the plurality of sellers.

3. The method of claim 2 wherein terminating negotiations comprises making the selected bids unavailable to the others of the plurality of sellers.

4. The method of claim 2 wherein the selected bids relate to more than one of the plurality of products.

5. The method of claim 2 wherein the selected bids relate to one of the plurality of products.

6. The method of claim 2 wherein the plurality of bids are all for a first amount.

7. The method of claim 2 wherein the plurality of bids are for varying amount.

8. The method of claim 1 wherein the agreement comprises an acceptance by either of the buyer and one of the plurality of sellers.

9. The method of claim 1 further comprising enabling the buyer to define the mutually exclusive group.

10. The method of claim 9 wherein enabling the buyer to define the mutually exclusive group comprises allowing the buyer to identify selected ones of the plurality of products with the mutually exclusive group.

11. The method of claim 10 further comprising enabling the buyer to define more than one mutually exclusive group.

12. A computer program product, comprising:

at lest one computer-readable medium; and a computer program mechanism em bedded in the at least one computer-readable medium for causing a computer to facilitate a transaction between a buyer and one of a plurality of seller via a network, the computer program mechanism comprising:

first instruction for enabling the buyer to generate a shopping list identifying at lest one product associated with the plurality of seller, each entry in the shopping list corresponding to one of the at least one product and a corresponding one of the plurality of seller;

second instruction for identifying the shopping list as a mutually exclusive group in response to receiving input from the buyer via the network, the mutually exclusive group including each entry in the shopping list;

third instructions for enabling the buyer to negotiate substantially simultaneously with the plurality of sellers in the mutually exclusive group via the network; and fourth instructions for when an agreement is reached is between the buyer and a first one of the plurality of sellers in the mutually exclusive group, automatically terminating negotiations between the buyer and others of the plurality of seller in the mutually exclusive group.

13. A computer-implemented method for facilitating a transaction between a buyer and a seller via a network, the method comprising:

enabling the buyer to generated a shopping list identifying a plurality of products associated with the seller, each entry in the shopping list corresponding to one of the plurality of products;

identifying the shopping list as a mutually exclusive group in response to receiving input from the buyer via the network, the mutually exclusive group including each entry in the shopping list;

enabling the buyer to negotiate substantially simultaneously with the seller for the plurality products in the mutually exclusive group via the network; and when an agreement is reached between the buyer and the seller for a first one of the plurality products in the mutually exclusive group, automatically terminating negotiations between the buyer and the seller for others of the plurality of plurality of products in the mutually exclusive group.

* * * * *